US011245809B2

(12) United States Patent
Takano

(10) Patent No.: US 11,245,809 B2
(45) Date of Patent: Feb. 8, 2022

(54) INFORMATION PROCESSING APPARATUS AND COMPUTER READABLE MEDIUM FOR CHANGING DOCUMENT DISPLAY MODES

(71) Applicant: FUJIFILM BUSINESS INNOVATION CORP., Tokyo (JP)

(72) Inventor: Kentaro Takano, Ashigarakami-gun (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 23 days.

(21) Appl. No.: 16/519,569

(22) Filed: Jul. 23, 2019

(65) Prior Publication Data

US 2020/0252518 A1     Aug. 6, 2020

(30) Foreign Application Priority Data

Feb. 4, 2019   (JP) .............................. JP2019-017659

(51) Int. Cl.
| | | |
|---|---|---|
| *H04N 1/32* | (2006.01) | |
| *H04N 1/00* | (2006.01) | |
| *G06F 16/93* | (2019.01) | |
| *G06F 3/0481* | (2013.01) | |
| *G06F 16/35* | (2019.01) | |
| *G06F 16/383* | (2019.01) | |

(52) U.S. Cl.
CPC ....... *H04N 1/32101* (2013.01); *G06F 3/0481* (2013.01); *G06F 16/358* (2019.01); *G06F 16/383* (2019.01); *G06F 16/93* (2019.01); *H04N 1/00233* (2013.01); *G06F 2203/04804* (2013.01)

(58) Field of Classification Search
CPC .. H04N 1/00151; H04N 1/342; H04N 1/4406; H04N 1/444; H04N 1/4446; H04N 1/448; H04N 2201/3246; H04N 1/00161; G06F 2221/2137; G06F 16/93; G06F 21/00; G06Q 50/01; G06Q 50/00
See application file for complete search history.

(56) References Cited

U.S. PATENT DOCUMENTS

| | | | |
|---|---|---|---|
| 5,479,602 A | 12/1995 | Baecker et al. | |
| 5,831,617 A | 11/1998 | Bhukhanwala | |
| 6,337,699 B1 * | 1/2002 | Nielsen | ............... G06F 3/04817 379/413.01 |

(Continued)

FOREIGN PATENT DOCUMENTS

| | | | |
|---|---|---|---|
| JP | 2005-190135 A | | 7/2005 |
| JP | 2005190135 A | * | 7/2005 |

(Continued)

OTHER PUBLICATIONS

Jul. 17, 2020 Office Action issued in Australian Patent Application No. 2019208256.

*Primary Examiner* — Kent Yip
(74) *Attorney, Agent, or Firm* — Oliff PLC

(57) ABSTRACT

An information processing apparatus includes a display unit that display's a document in a first display mode by switching a document display mode from a second display mode to the first display mode in a case where the document displayed is a distributed document or a document having been distributed, where the document has not been browsed, and where a browsing time limit set for the document expires within a first predetermined period.

16 Claims, 24 Drawing Sheets

(56) References Cited

U.S. PATENT DOCUMENTS

| | | | | |
|---|---|---|---|---|
| 2005/0188320 | A1* | 8/2005 | Bocking | G06F 3/04895 |
| | | | | 715/752 |
| 2007/0011622 | A1 | 1/2007 | Chae et al. | |
| 2007/0277102 | A1* | 11/2007 | Kanzaki | G06F 16/986 |
| | | | | 715/210 |
| 2009/0006949 | A1* | 1/2009 | Takeuchi | G06F 21/10 |
| | | | | 715/255 |
| 2013/0132908 | A1* | 5/2013 | Lee | G06F 3/04842 |
| | | | | 715/838 |

FOREIGN PATENT DOCUMENTS

| | | |
|---|---|---|
| JP | 2012-128687 A | 7/2012 |
| JP | 5747344 B2 | 7/2015 |

\* cited by examiner

FIG. 4

| DOCUMENT ID | DOCUMENT NAME | CREATION DATE AND TIME | CREATOR | DISTRIBUTOR | DISTRIBUTION DATE AND TIME | BROWSING TIME LIMIT | BROWSING RANGE | BROWSING DATE AND TIME | BROWSING PERSON | ... |
|---|---|---|---|---|---|---|---|---|---|---|
| | | | | | | | | | | |

FIG. 7

| 705 | 710 | 715 | 720 | 725 |
|---|---|---|---|---|
| DOCUMENT ID | DATE AND TIME | TRANSMITTER | RECIPIENT | DOCUMENT |
| | | | | |

| 805 | 810 | 815 | 820a | 820b | | 830 |
|---|---|---|---|---|---|---|
| MEETING ID | DATE AND TIME | NUMBER OF MEETING PERSONS | MEETING PERSON 1 | MEETING PERSON 2 | ... | PLACE |
| | | | | | | |

800

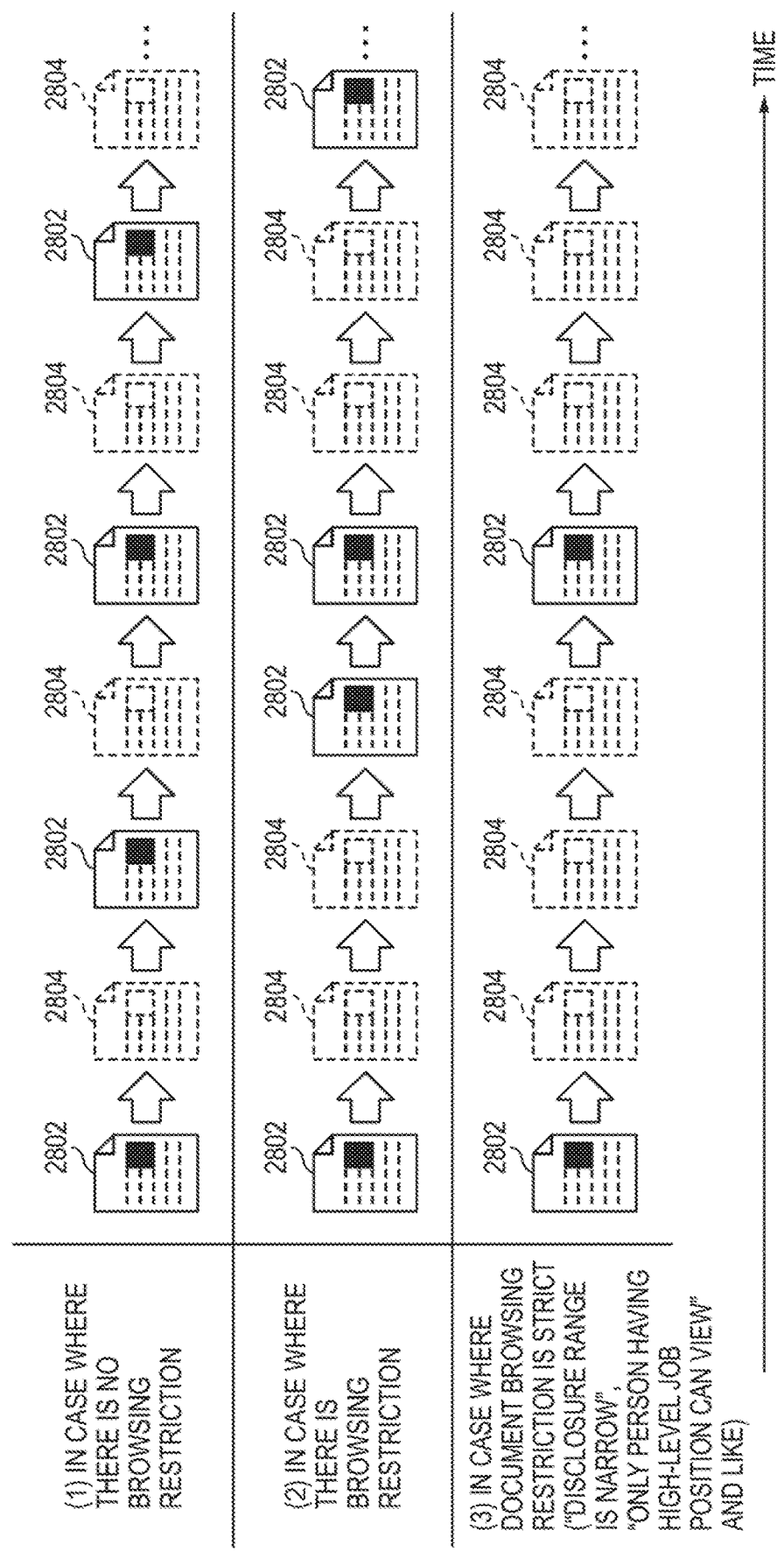

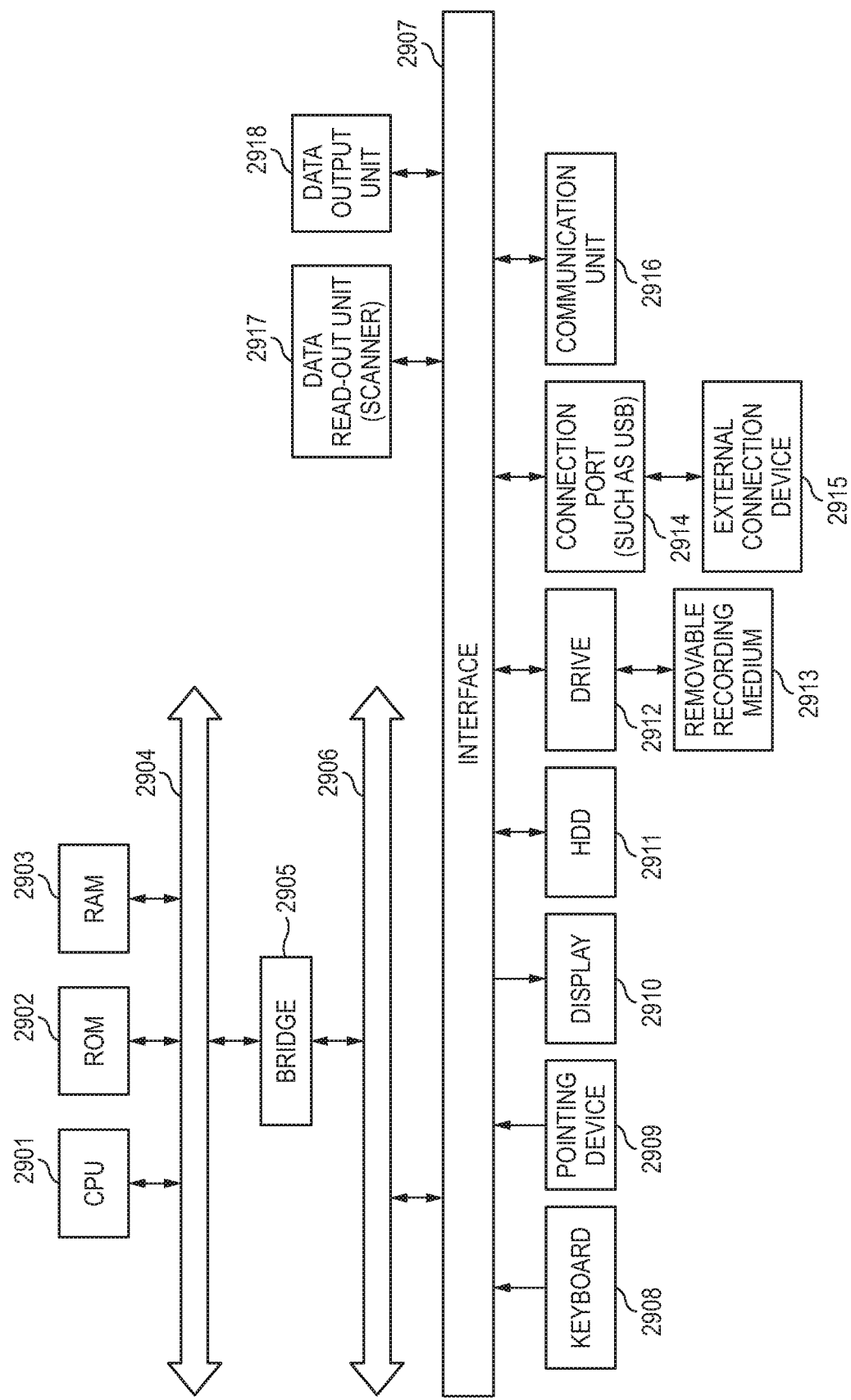

INFORMATION PROCESSING APPARATUS AND COMPUTER READABLE MEDIUM FOR CHANGING DOCUMENT DISPLAY MODES

CROSS-REFERENCE TO RELATED APPLICATIONS

This application is based on and claims priority under 35 USC 119 from Japanese Patent Application No. 2019-017659 filed on Feb. 4, 2019.

BACKGROUND

Technical Field

The present invention relates to an information processing apparatus and a computer readable medium storing an information processing program.

Related Art

JP-A-2005-190135 is intended to provide an information processing apparatus capable of easily grasping the degree of security of individual document data to be accessed and capable of efficiently executing access to document data, a control method thereof, and a program. JP-A-2005-190135 discloses flatters that user authentication of a user who requests access to a document file for which a user's access right is set is performed, a security level of the user for the document file is calculated based on the user's access right to the document file when the user authentication is successful, and an operation screen including icon images corresponding to at least a part of pages constituting the document file is generated based on the calculated security level are disclosed.

Japanese Patent No. 5747344 is intended to improve visibility of a document to be processed to a user by displaying a thumbnail image of document data after a lapse period at a size larger than that of document data before the lapse period when displaying the thumbnail image of registered document data and prevent omission of processing due to sorting of document data in an information processing apparatus. Japanese Patent No. 5747344 discloses a document management system which included a document management server for managing document data, date and time information corresponding to the document data, and a lapse period for determining a lapse from the date and time information and an information processing apparatus for displaying the document data, and in which the document management server includes thumbnail image generation unit that, generates plural thumbnail image data of different sizes corresponding to the document data, date and time information acquisition unit that acquires date and time information of document data in a folder to be displayed on the information processing apparatus, thumbnail image acquisition unit that acquires thumbnail image data of a predetermined size, which is generated by the thumbnail image generation unit and corresponds to an elapsed period of each, document data in the folder, so, that thumbnail image data of document data after the lapse period is displayed in a larger size than thumbnail image data of document data before the lapse period according to the lapse period from the date and time information, in order for document data, for which a predetermined period has elapsed among the document data in the folder, to be identified and displayed to the user when displaying the document data according to a sort condition in a display unit of the information processing apparatus, and thumbnail image transmission unit that transmits the thumbnail image data acquired by the thumbnail image acquisition unit to the information processing apparatus, and the information processing, apparatus includes thumbnail image receiving unit that receives the thumbnail image data corresponding to each document data in the folder from the document management server and display control unit that displays thumbnail image data received by the thumbnail image receiving unit on a document list display screen.

SUMMARY

There is a document for which a browsing time limit is set. The document may be deleted if the browsing time limit has passed without knowing that the browsing time limit is approaching.

Aspect of non-limiting embodiments of the present disclosure relates to provide an information processing apparatus and a computer readable medium storing an information processing program capable of alerting a user that a browsing time limit is approaching in a case where the document is a document for which the browsing time limit has been set and which has not been browsed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a display unit that displays a document in a first display mode by switching a document display mode from a second display mode to the first display mode in a ease where the document displayed is a distributed document or a document having been distributed, where the document has not been browsed, and where a browsing time limit set for the document expires within a first predetermined period.

BRIEF DESCRIPTION OF DRAWINGS

Exemplary embodiment(s) of the present invention will be described in detail based on the following figures, wherein:

FIG. 4 is an explanatory view illustrating an example of a data structure of a document management table;

FIG. 7 is an explanatory view illustrating an example of a data structure of a transmission and reception management table;

FIG. 8 is an explanatory view illustrating an example of a data structure of a meeting management table;

FIG. 28 is an explanatory view illustrating examples of a process according to this exemplary embodiment; and FIG. 29 is a block diagram illustrating an example of a hardware configuration of a computer for realizing this exemplary embodiment.

DETAILED DESCRIPTION

Hereinafter, an exemplary embodiment for realizing the present invention will be described based on the drawings.

Figure 1:
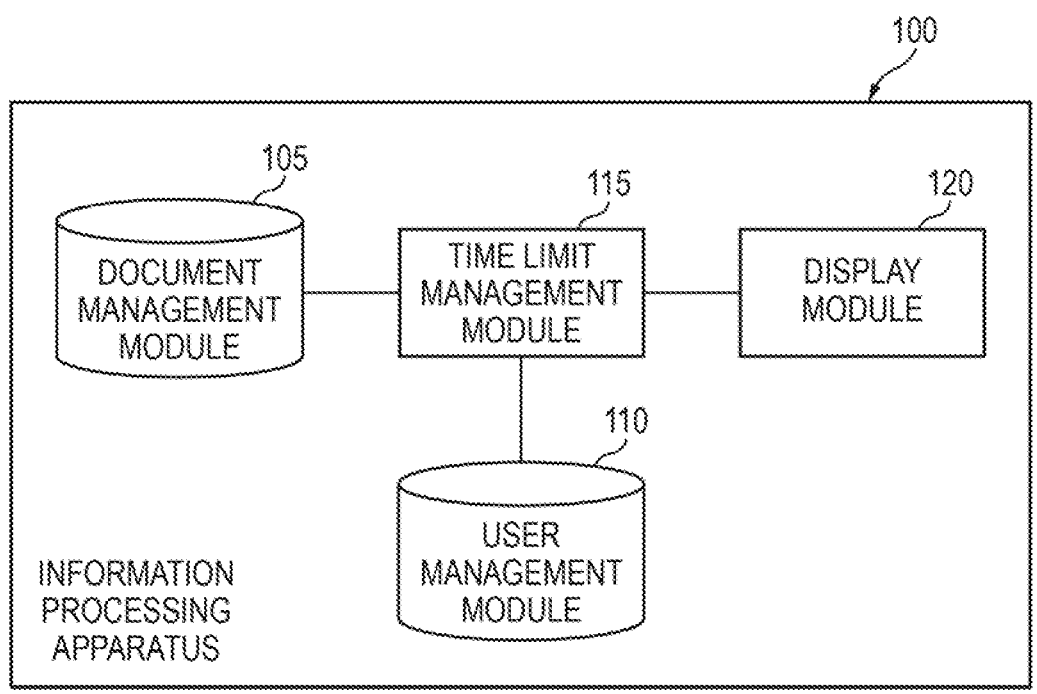
FIG. 1 is a conceptual module configuration diagram of a configuration example of the present exemplary embodiment.

FIG. 1 illustrates a conceptual module configuration diagram of a configuration example of this exemplary embodiment.

Modules generally refer to components such as software (computer program) and hardware that are logically separatable. Accordingly, the modules in this exemplary embodiment refer not only to a module in the computer program but also to a module in a hardware configuration. Therefore, this embodiment also serves as a description of a computer program (a program for causing a computer to execute each procedure, a program for causing a computer to function as each unit, a program for causing a computer to realize each function), a system, and a method for functioning as those modules. However, for convenience of explanation, "store", "is stored", and terms equivalent to these are used, but in a case where an embodiment is a computer program, these terms mean that computer program is stored in a storage device or controlled to be stored in the storage device. Also, the modules may correspond to functions one to one, but in mounting, one module may be configured by one program, or plural modules may be configured by one program, and conversely, one module may be configured by plural programs. Plural modules may be executed by one computer, or one module may be executed on plural computers by computers in a distributed or parallel environment. One module may include another module. In the following, "connection" is used not only for a case of physical connection but also for a case of logical connection (transfer of data, instruction, reference relationship between data, login, and the like). The "predetermined" means that it is determined before a target process is performed. Before the process according to this exemplary embodiment starts, of course, even after the process according to the present exemplary embodiment starts, if it is before the target process, it is used by including the meaning of being determined in accordance with the situation and condition at that time or according to the situation and condition up to that time. When there are plural "predetermined values", these values may be different values, or two or more values (of course, all the values are also included) may be the same. The description "to perform B when it is A" is used in the meaning of "it is determined whether or not it is A, and when it is determined that it is A, B is performed". However, a case where determination of whether it is A or snot is unnecessary is excluded. A case of listing things like "A, B, and C" and the like is an illustrative list unless otherwise stated, and includes a case where only one (for example, only A) of those is selected.

In addition to a case where a system or an apparatus has a configuration in which a plurality of computers, hardware, devices and the like are connected by communication unit such as a network (including one-to-one communication connection), a case where the system or the apparatus is realized by one computer, hardware, apparatus or the like is also included. The terms "apparatus" and "system" are used interchangeably. Of course, the "system" does not include what is merely a social "system" (social system) that is an artificial arrangement.

In a case where plural processes are performed for each process by each module or in each module, target information is read from the storage device for each process, and the process result is written to the storage device after the process is performed. Accordingly, the description for reading from the storage device before the process is performed and writing to the storage device after the process is performed may be omitted. The storage device here may include a hard disk drive, a random access memory (RAM), an external storage medium, a storage device through a communication channel, a register in a central processing unit (CPU), and the like.

An information processing apparatus 100 according to this exemplary embodiment has a display control function of browsing time limit, and includes a document management module 105, a user management module 110, a time limit management module 115, and a display module 120, as illustrated in the example of FIG. 1.

A document (also, referred to as a file) is text data, numerical data, graphic data, image data, moving image data, audio data, and the like, or a combination thereof, refers to something that can be targets for storing, editing, searching, and the like and exchanged as individual units between systems or users, and includes those similar to these. Specifically, the document includes a document created by a document creation program (so-called word processing software), an image read by an image reading device (scanner or the like), a web page, and the like.

The browsing time limit may be set for the document. In a case where this exemplary embodiment is not used, a document for which "cares should be taken" cannot be accessed without noticing the browsing time limit.

Therefore, the information processing apparatus 100 is configured to switch the display mode for a document which has, not been browsed and of which the browsing time limit is approaching and to display the document in the display mode switched.

The document management module 105 is connected to the time limit management module 115. The document management module 105 stores information on the document. Information on the document includes the document, attribute information attached to the document, and the like. For example, the document includes information indicating whether or not the document is a distributed document or a document having been distributed, a browsing time limit, a user who has to browse, a user who browsed, date and time of browsing (year, month, day, hour, minute, second or less, or a combination thereof).

The user management module 110 is connected to the time limit management module 115. The user management module 110 stores information on the user. Information on the user includes information indicating that the users have met each other, information indicating that the information has been exchanged between the users, and the like.

The time limit management module 115 is connected to the document management module 105, the user management module 110, and the display module 120. The time limit management module 115 performs document browsing time limit management. Specifically, among the documents displayed on a display device, the distributed document or the document having been distributed which has not been browsed and whose browsing time limit expires within a predetermined period from the present is extracted.

The display module 120 is connected to the time limit management module 115. The display module 120 controls display of the document on the display device. For example, the display module 120 switches the display mode of the document in accordance with a processing result (among the documents displayed on a display device, the document distributed or the distributed document the document being distributed which is not browsed and whose browsing time limit is within a predetermined period from the present) of the time limit management module 115. The "switch the display mode" may be changing a shape, a pattern, or a color, dynamically changing (for example, flash, animation, and the like) the shape, the pattern, or the color, blinking (target of change in blinking is whether or not to perform blinking, a period during which blinking is performed, an interval of blinking, and the like), or a combination thereof.

In a case where the document is a document which is the distributed document or the document having been distributed among the displayed documents, which is not browsed, and whose browsing time limit expires within a predetermined period from the current time, the display module 120 switches the display mode of the document and displays the document in the switched display mode for the document.

Here, the "displayed document" refers to a document (including the document itself, a symbol representing the document, and the like) displayed on the display device, and includes, for example, an icon of a document displayed on a personal computer screen used by a user, a display screen of a portable terminal, and the like. Examples of the display device include a liquid crystal display, an organic electroluminescence (EL), and the like. Specifically, the "document displayed on the display device" may be a document icon on a desktop, a document icon in a folder window, a document icon in a window of the Internet browser, or the like.

A "distributed document" is a document that a user is required to browse. The user here is a person who has to browse. Examples of distribution include, for example, transmission by e-mail, registration to a designated folder (a folder in which a document that a predetermined user has to browse is stored), or the like.

The "document having been distributed" is a document that the user A requires the other user B to browse. Here, the user A is a creator or distributor of the document (including a person who can change the browsing time limit).

The "not browsed" corresponds to a case where a target document has not been opened. The "distributed document is not browsed" indicates a state where a target user (user himself) is not browsing the document. A case where the display mode for the document is switched and displayed in the switched display mode indicates that the user himself is not browsing the document. On the other hand, "a document having been distributed is not browsed" indicates a state in which a document having been distributed by the creator or the distributor has not been browsed by a user who has to browse the document. In a case where the display mode of the document is switched and the document is displayed in the switched display mode, the creator or the distributor may know that the document is not being browsed by another user (user who has to browse).

"When the browsing time limit expires within a predetermined period from the present" indicates that the document browsing time limit is approaching.

The display module 120 may switch the display mode of the document and display the document in the switched display mode on condition that the user who browses the document has a relationship with the distributor or creator of the document within a predetermined period.

Here, the "case of having the relationship" may correspond to any one or both of a case where the user and the distributor or the creator have met each other and a case where information has been exchanged between the user and the distributor or the creator.

Then, the "information is exchanged between the user and the distributor or creator" corresponds to, for example, use of electronic mail, use of a message transmission and reception function such as social networking service (SNS), and the like. The "exchange" includes only transmission (only reception), in addition to transmission and reception.

The display module 120 may switch the display mode of the document and display the document in the switched display mode on condition that a first user who browses the document has a relationship with the other second user who browses the document within a predetermined period.

Here, the "case of having a relationship" may correspond to any one or both of a case where the first user and the second user have met each other and a case where information has been exchanged between the first user and the second user.

The display module 120 may repeat switching of the display mode and returning to the original display mode as "switches the display mode of the document and displays the document in the switched display mode".

The display module 120 may shorten an interval of the repetition when the remaining time before the browsing time limit expires becomes short.

The display module 120 may shorten the interval of the repetition on condition that the user who browses the document has a relationship with the distributor or creator of the document within a predetermined period.

The display module 120 may shorten, the interval, of the repetition on condition that the first user who browses the document has a relationship with the other second user who browses the document within a predetermined period.

The display module 120 is a folder including plural documents, and switches the display mode of the folder and displays the folder in the switched display mode in a case where the number of documents whose display mode is to be switched is greater than or equal to a predetermined number in the folder or in a case where a ratio of the documents in the folder is greater than or equal to a predetermined value.

The display module 120 may repeat switching of the display mode of the folder and returning to an original display mode.

The display module 120 may shorten the interval of the repetition when the number of documents whose display mode is to be switched in the folder increases.

The display module 120 may, reduce the number of documents to be displayed by switching the display mode in a case where the number of documents whose display mode is to be switched is greater than or equal to a predetermined number or in a case where a ratio of the documents whose display mode is to be switched among displayed documents is greater than or equal to a predetermined value.

The display module 120 may perform any of (1) sorting the documents in descending order by the number of persons who have to browse the document, (2) sorting the documents in descending order by the number of persons who have already browsed the document, (3) sorting the documents in ascending order by the number of days until the browsing time limit, and (4) sorting browsing periods in ascending order, switch the display mode for the documents up to a predetermined rank and display the documents in the switched display mode.

Here, "sorting the browsing periods in ascending order" may be performed to recommend early browsing because the browsing period is set short itself.

The display module 120 may switch the display mode for a displayed first document and display the first document in the switched display mode in a case where a second document associated with the displayed first document is present and the first document and the second document are not browsed.

A case where "the document associated with the displayed document" may be exemplified as a case where the displayed document includes a link to an associated document. The second document may not be the "displayed document". Specifically, this is a case where the icon of the second document is not displayed on the personal computer screen, the portable terminal or the like used by the user.

The display module 120 may switch the display mode and display the first document in the switched display mode even if the first document is browsed, in a case where the second document associated with the displayed first document is present and the second document is not browsed.

The display module 120 may not switch the display mode for the first document in a case where the second document associated with the displayed first document is present and any one of the documents is browsed.

The display module 120 may switch the display mode for the first document and display the first document in the switched display mode in a case where the second document associated with the displayed first document is present and the first document and the second document has not been simultaneously browsed.

The display module 120 may change the display mode for the document and display the document in the changed display mode in a case where writing is made to the document.

Here, a case where "writing is made to the document" corresponds to, for example, a case where an annotation and the like is added to the document.

A case where "changes the display mode" corresponds to, for example, a case where a mark (such as a pencil mark) indicating that writing is made to the document is added.

The display module 120 may shorten the interval of the repetition in a case where writing is made to the document.

The display module 120 may display a reduced image of the first page of the document and switch the display mode for the reduced image to display the reduced image in the switched display mode in a case where the document of which the browsing time limit has expired is displayed.

Here, it is general to make the document of "the document of which the browsing time limit has expired" inaccessible (for example, deletion of the document). However, requesting the administrator to make the document browsable again, to make the document browsable as it is without deleting the document even after the browsing time limit expires, or the like is performed. The "case where the document of which the browsing time limit has expired is displayed" refers to such a situation.

The display module 120 may repeat switching of the display mode and returning to the original display mode.

The display module 120 may adjust the display time period for which the reduced image is displayed in the switched display mode in accordance with a level of browsing authority for the document.

Then, the display module 120 may extend the display time period for which the reduced image is displayed in the switched display mode in a case where the level of the browsing authority for the document is set high.

FIG. 2 is an explanatory view illustrating an example of a system configuration using this exemplary embodiment.

Figure 2A:
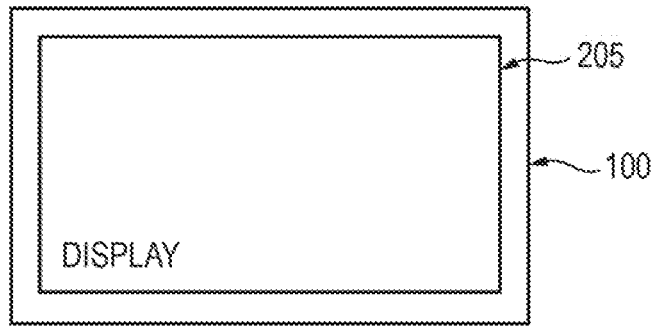
FIGS. 2A and 2B are explanatory views illustrating an example of a system configuration using this exemplary embodiment.

FIG. 2A illustrates an example of a stand-alone type system configuration.

The information processing apparatus 100 includes a display 205. The display module 120 changes the display mode of a target document icon displayed on the display 205 and displays the document icon.

Figure 2B:
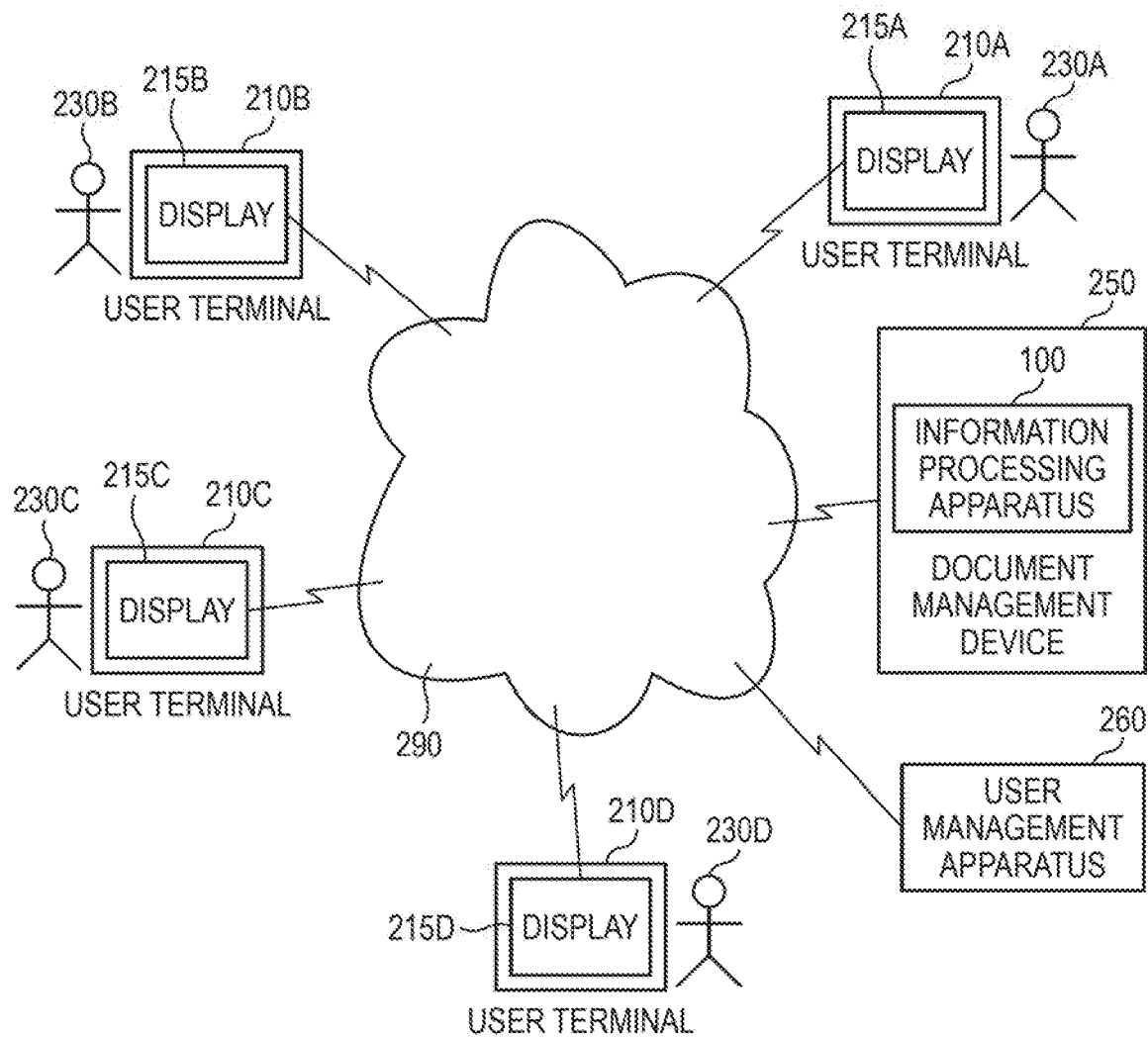

FIG. 2B illustrates an example of a network type system configuration.

A user terminal 210 includes a display 215. A document management apparatus 250 includes the information processing apparatus 100. A user terminal 210A, a user terminal 2108, a user terminal 210C, a user terminal 210D, the document management apparatus 250, and a user management apparatus 260 are connected to one another through a communication channel 290. The communication channel 290 may be a wireless or wired communication channel, or a combination thereof, and may be, for example, the Internet, intranet, or the like as a communication infrastructure. The function of the information processing apparatus 100 may be realized as a cloud service. The document management apparatus 250 may have a function of the document management module 105, the user management apparatus 260 may have a function of the user management module 110, and the information processing apparatus 100 may use the document management apparatus 250 instead of the document management module 105 and use the user management apparatus 260 instead of the user management module 110.

When displaying the document icon on the display 215, each user terminal 210 changes the display mode of the target document icon and displays the target document icon with the changed display mode according to control of the information processing apparatus 100 of the document management apparatus 250.

A user 230 who has to browse the document confirms that the display mode of the document icon in the display 215 has been changed, and understands that the document is a document for which a browsing time limit is approaching. That is, the user 230 is prompted to browse a target document.

The user 230 who is the creator or distributor of the document to be browsed confirms that the display mode of the document icon in the display 215 has been changed, and understands that the document is a document for which the browsing time limit is approaching but has not yet been browsed by another user 230. The user 230 who is the creator or distributor may alert (for example, an alert using email, a message transmission and reception function in SNS, and the like) the user 230 who is not browsing.

In the examples illustrated in FIG. 3 to FIG. 10, it is determined whether or not to display an animation in a browsing state of a document.

Figure 3:
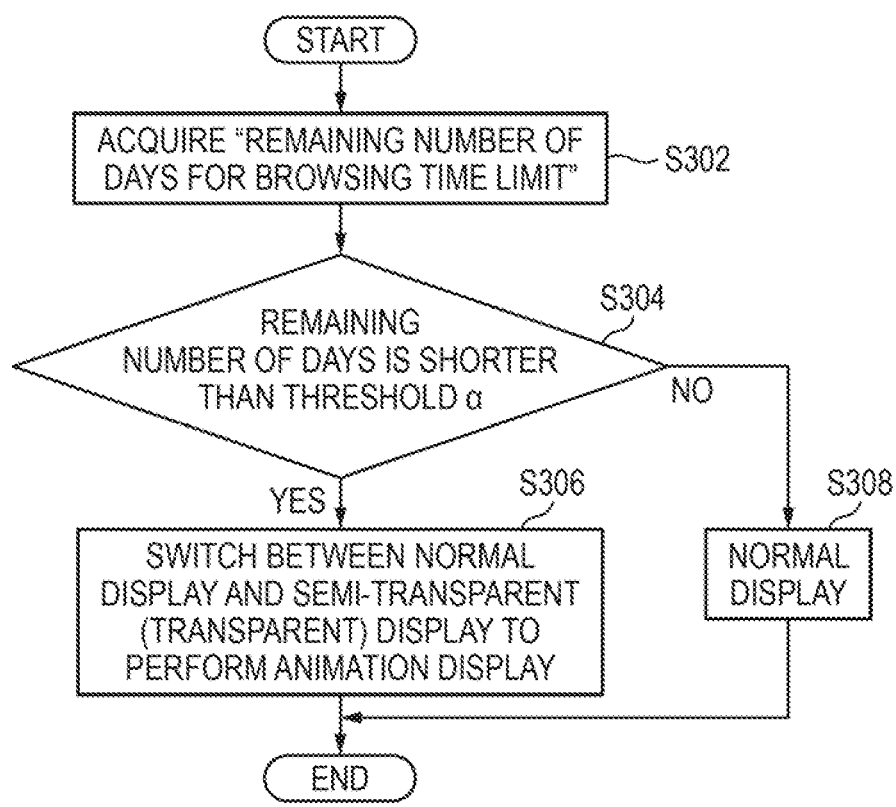
FIG. 3 is a flowchart illustrating an example of a process according to this exemplary embodiment.

FIG. 3 is a flowchart illustrating an example of a process (example of a basic process) according to this exemplary embodiment. A document icon displayed on the display device is a target, and a document icon not displayed on the display device is not the target.

In step S302, the remaining number of days for the browsing time limit is acquired for the displayed document icon. For example, the remaining number of days for the browsing time limit may be calculated from the document management table 400.

In step S304, it is determined whether or not the remaining number of days is shorter than a threshold $\alpha$. When it is determined that the remaining number of days is shorter than the threshold $\alpha$, the process proceeds to step S306, and otherwise the process proceeds to step S308. The threshold $\alpha$ is a predetermined value.

In step S306, display is switched between normal display and semi-transparent (or transparent) display and animation display is performed.

In step S308, normal display is performed.

FIG. 4 is an explanatory view illustrating an example of a data structure of the document management table 400. The document management table 400 is stored in the document management module 105. The document management table 400 includes a document ID field 405, a document name field 410, a creation data and time field 415, a creator field 420, a distributor field 425, a distribution data and time field 430, a browsing time limit field 435, a browsing range field 440, and a browsing date and time field 445, and a browsing person field 450, and the like. The document ID field 405 stores information for uniquely identifying a document identification (ID) in this exemplary embodiment. The document name field 410 stores a document name of the document. The creation date and time field 415 stores a creation data and time of the document. The creator field 420 stores a creator of the document. The distributor field 425 stores a distributor of the document. The distribution date field 430 stores a distribution data and time of the document. The browsing time limit field 435 stores a browsing time limit of the document. The browsing range field 440 stores a browsing range of the document. Specifically, a user who has to browse the document is stored. The browsing data and time field 115 stores a browsing data and time of the document. The browsing person field 450 stores a browsing person of the document.

For example, in a case where the target user 230 is not a user (that is, not the creator, not the distributor) in the creator field 420 or the distributor field 425 and is not present in the browsing person field 450, the remaining number of days (the number of days from the present to the browsing time limit) may be calculated from the browsing time limit field 435. In a case where the target user 230 is a user in the creator field 420 or the distributor field 425, when all of the users in the browsing range field 440 are not included in the browsing person field 450 (when any one of the users in the browsing range field 440 is not included in the browsing person field 450, that is, when there are users 230 who do not browse the document), the number of remaining days (the number of days from the present to the browsing time limit) may be calculated from the browsing time limit field 435.

Figure 5:
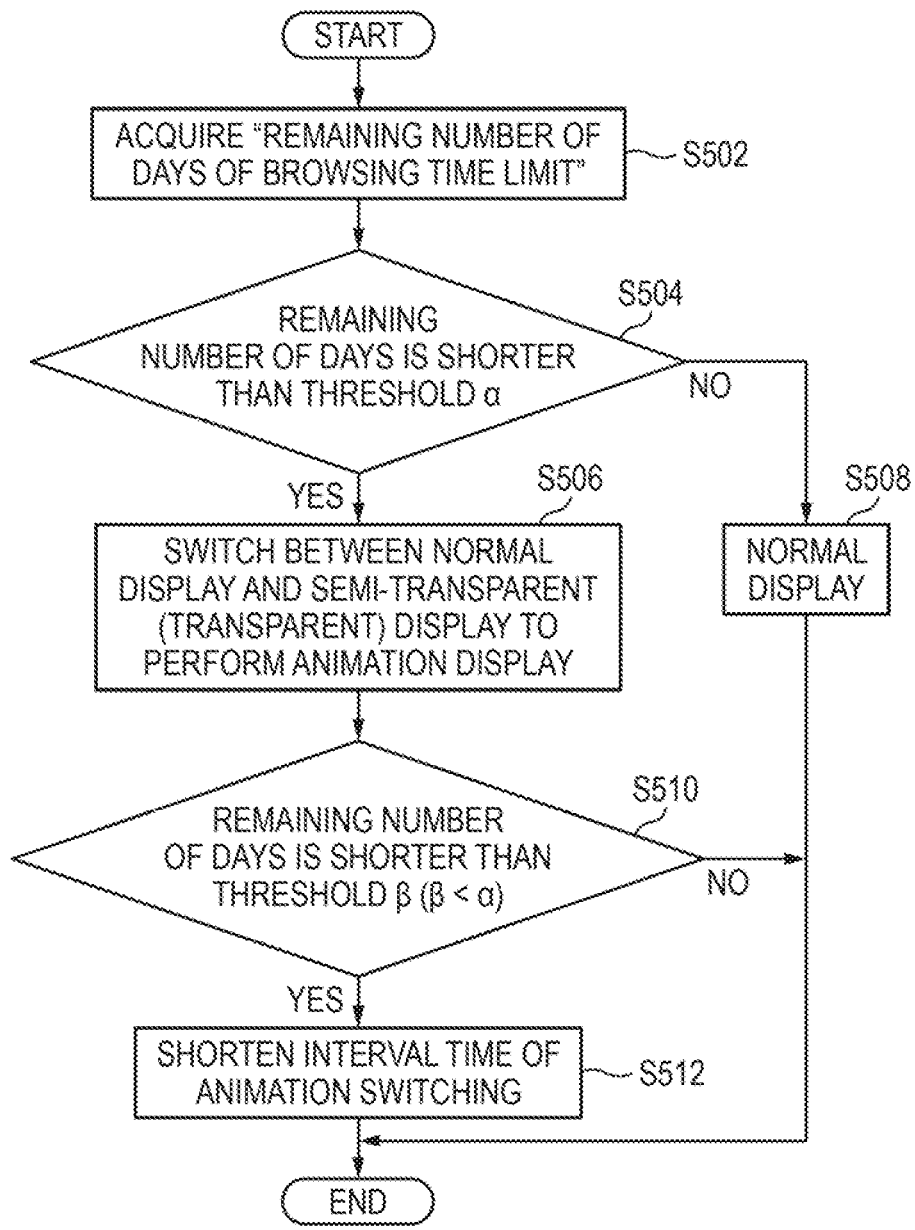
FIG. 5 is a flowchart illustrating an example of a process according to this exemplary embodiment.

FIG. 5 is a flowchart illustrating an example of a process according to this exemplary embodiment. FIG. 5 illustrates a process example which further considers also a case where the browsing time limit is approaching rather than the example of the flowchart illustrated in the example of FIG. 3. A document icon displayed on the display device is, a target, and a document icon not displayed on the display device is not the target.

Processes of steps S502 to S508 are equivalent to the processes of steps S302 to S308 of the flowchart illustrated in the example of FIG. 3.

In step S502, the remaining number of days of the browsing time limit for the displayed document icon is acquired.

In step S504, it is determined whether or not the remaining number of days is shorter than the threshold $\alpha$. When it is determined that the remaining number of days is shorter than the threshold $\alpha$, the process proceeds to step S506, and otherwise the process proceeds to step S508.

In step S506, display is switched between the normal display and semi-transparent (or transparent) display, and animation display is performed.

In step S508, normal display is performed.

In step S510, it is determined whether or not the remaining number of days is shorter than a threshold $\beta(\beta<\alpha)$. When it is determined that the remaining number of days is shorter than the threshold $\beta$, the process proceeds to step S512, and otherwise the process ends.

In step S512, the interval time of animation switching is shortened.

Figure 6:
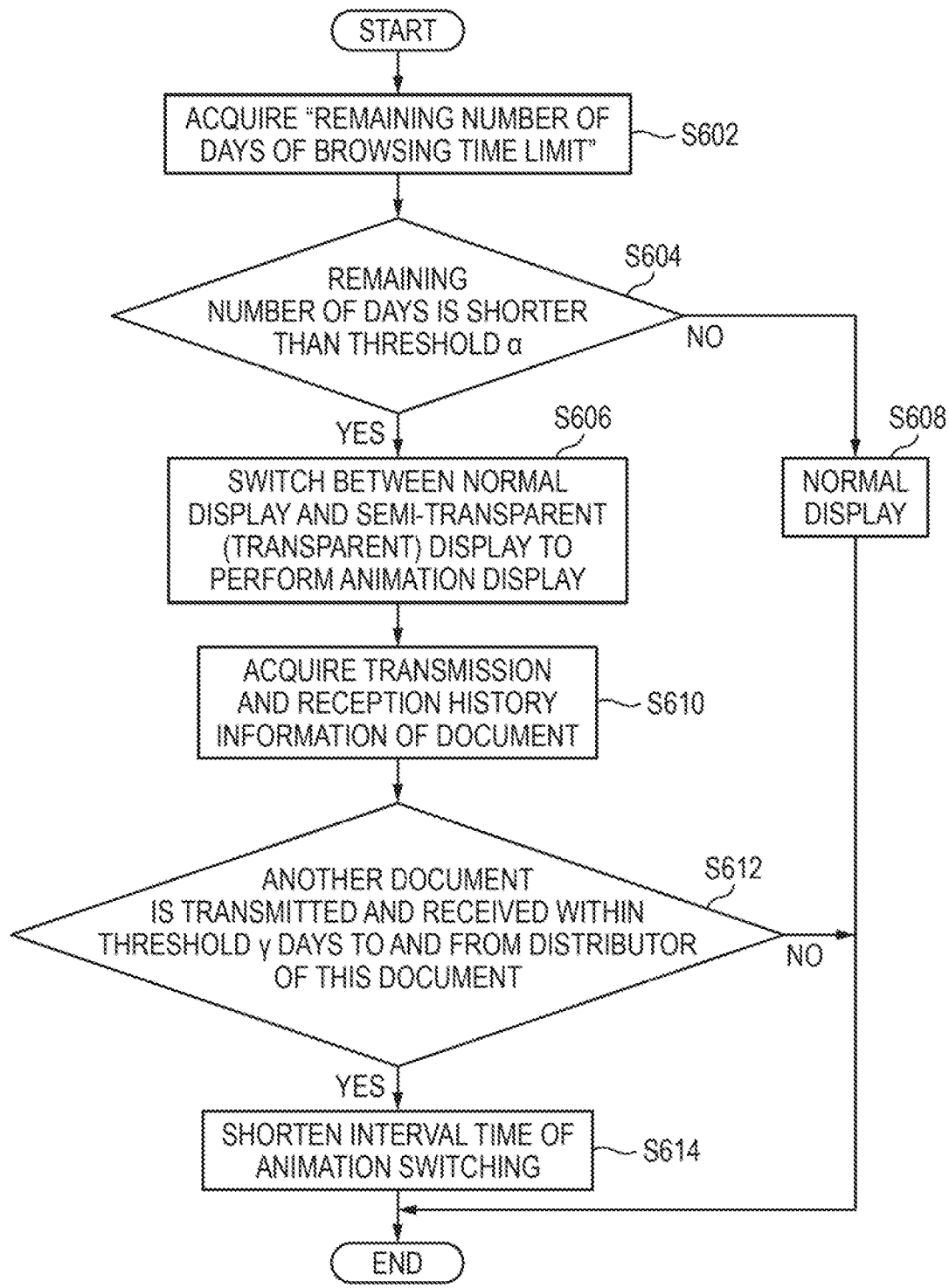
FIG. 6 is a flowchart illustrating an example of a process according to this exemplary embodiment.

FIG. 6 is a flowchart illustrating an example of a process according to this exemplary embodiment. FIG. 6 illustrates a process example in a case where a document distributor or creator has recently worked together. A document icon displayed on the display device is a target, and a document icon not displayed on the display device is not the target.

Processes of steps S602 to S608 are equivalent to the processes of steps S302 to S308 of the flowchart illustrated in the example of FIG. 3.

In step S602, the remaining number of days of the browsing time limit for the displayed document icon is acquired.

In step S604, it is determined whether or not the remaining number of days is shorter than the threshold $\alpha$. When it is determined that the remaining number of days is shorter than the threshold $\alpha$, the process proceeds to step S606, and otherwise proceeds to step S608.

In step S606, display is switched between normal display and semi-transparent (or transparent) display and animation display is performed.

In step S610, transmission and reception history information of the document is acquired. For example, a transmission and reception management table 700 may be acquired.

In step S612, it is determined whether or not another document is transmitted and received within a threshold γ days to and from the distributor (or may be the creator) of the document. When it is determined that transmission and reception of the other document is performed, the process proceeds to step S614 and otherwise, the process ends. Here, "another document" is a document different from the document of the target document icon.

In step S614, the interval time of animation switching is shortened. That is, a switching period in the display process in step S606 is shortened to attract more attention, hi step S608, normal display is performed.

Steps S510 and S512 of the flowchart illustrated in the example of FIG. 5 may be added, immediately after step S606, FIG. 7 is an explanatory view illustrating an example of a data structure of the transmission and reception management table 700. The transmission and reception management table 700 is stored in the user management module 110. The transmission and reception management table 700 includes a transmission and reception ID field 705, a date and time field 710, a transmitter field 715, a recipient field 720, and a document field 725. The transmission and reception ID field 705 stores information (transmission and reception ID) for uniquely identifying transmission and reception in this exemplary embodiment. The date and time field 710 stores the date and time when transmission and reception is performed. The transmitter field 715 stores a transmitter in the transmission and reception. The recipient field 720 stores a recipient in the transmission and reception. The document field 725 stores a document in the transmission and reception.

The determination may be made using a meeting management table 800 instead of the transmission and reception management table 700. That is, in steps S610 and S612, a meeting history of a target user is acquired (step S610), and a determination whether or not the target user meets the distributor (or may be the creator) of the document within threshold γ days (step S612) may be made.

FIG. 8 is an explanatory view illustrating an example of a data structure of the meeting management table 800. The meeting management table 800 is stored in the user management module 110. The meeting management table 800 includes a meeting ID field 805, a date and time field 810, a meeting person number field 815, a meeting person 1 field 820a, a meeting person 2 field 820b, and a place field 830. The meeting ID field 805 stores intonation (meeting ID) for uniquely identifying a meeting in this exemplary embodiment. The date and time field 810 stores the date and time when the meeting is performed. The meeting person number field 815 stores the number of persons in the meeting. A number of meeting person fields 820 continues by the number in the meeting person number field 815. The meeting person 1 field 820a stores the meeting person 1. The meeting person 2 field 820b stores the meeting person 2. The place field 830 stores a place where the meeting is performed. The meeting management table 800 may be created using a global positioning system (GPS) or the like built in the portable terminal obtained by each user 230, or schedule of each user 230 may be acquired from the schedule management system to extract the item of meeting (a meeting and the like). In particular, when browsing (or creating) a target document using the GPS and the document browsing history (editing history), users who are in the vicinity may be extracted.

Figure 9:
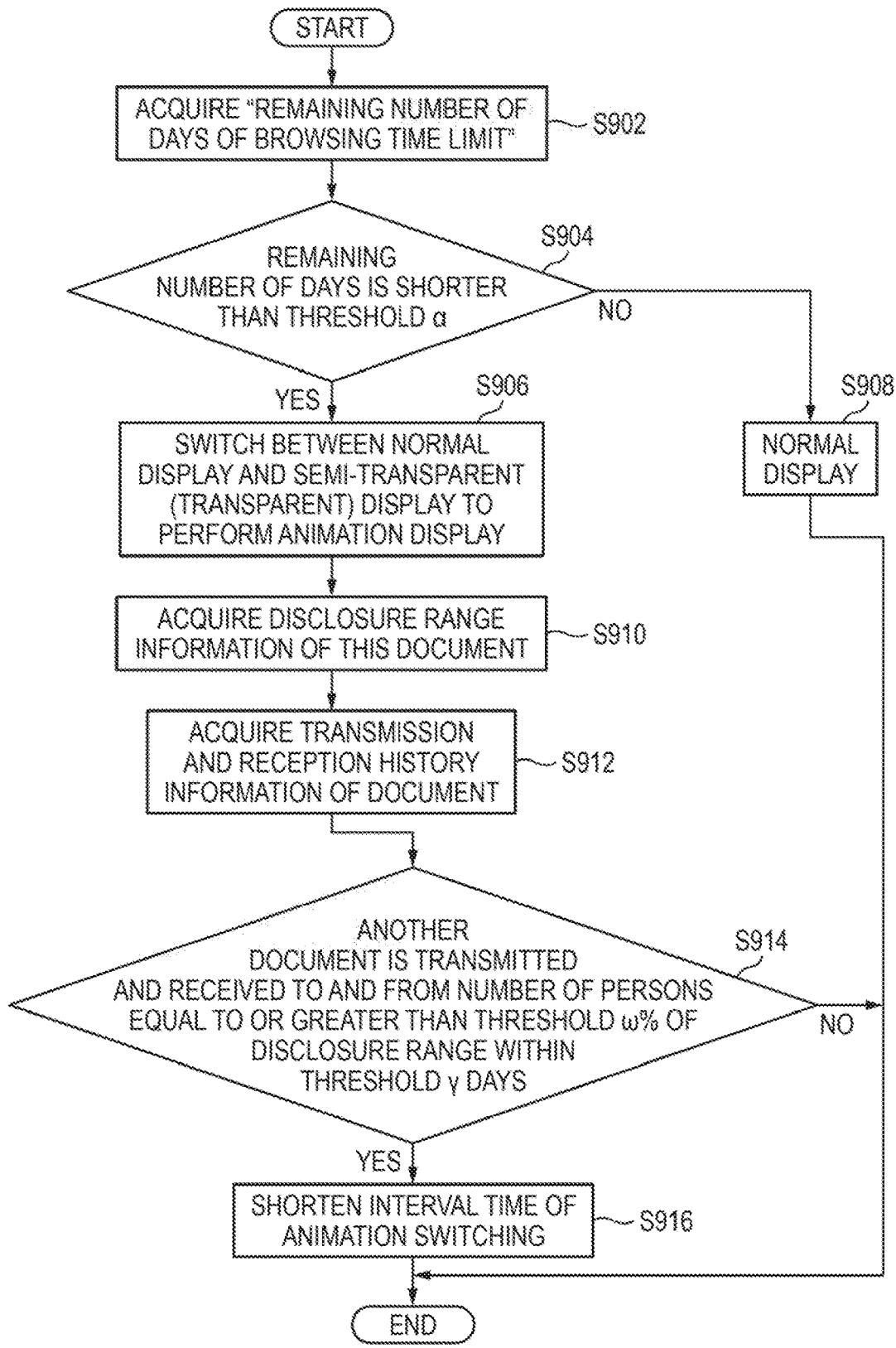
FIG. 9 is a flowchart illustrating an example of a process according to this exemplary embodiment.

FIG. 9 is a flowchart illustrating an example of a process according to this exemplary embodiment. FIG. 9 illustrates a process example of a case of recently working with a user within a disclosure range of a document. A document icon displayed on the display device is a target, and a document icon not displayed on the display device is not the target.

Processes of steps S902 to S908 are equivalent to the processes of steps S302 to S308 of the flowchart illustrated in the example of FIG. 3.

In step S902, the remaining number of days of the browsing time limit for the displayed document icon is acquired.

In step S904, it is determined whether or not the remaining number of days is shorter than the threshold α. When it is determined that the remaining number of days is shorter than the threshold α, the process proceeds to step S906, and otherwise the process proceeds to step S908.

In step S906, display is switched between normal display and semi-transparent (or transparent) display and animation display is performed.

In step S908, normal display is performed.

In step S910, disclosure range information of the document is acquired. For example, the document management table 400 (browsing range field 440) may be acquired.

In step S912, transmission and reception history information of the document is acquired. For example, the transmission and reception management table 700 may be acquired.

In step S914, it is determined whether or not another document is transmitted and received to and from a number of persons equal to or greater than a threshold ω% of the disclosure range within the threshold γ days. When it is determined that the document is transmitted and received to and from the number of persons equal to or greater than a threshold ω%, the process proceeds to step S916, and otherwise the process ends.

In step S916, the interval time of animation switching is shortened.

Steps S510 and S512 of the flowchart illustrated in the example of FIG. 5 may be added, immediately after step S906.

The meeting management table 800 may be used instead of the transmission and reception management table 700, and in steps S912 and S914, the meeting history of the target, user may be acquired (step S912) and it may be determined (step S914) whether or not the user meets the number of persons equal to or greater than the threshold ω% within the threshold γ days.

Figure 10:
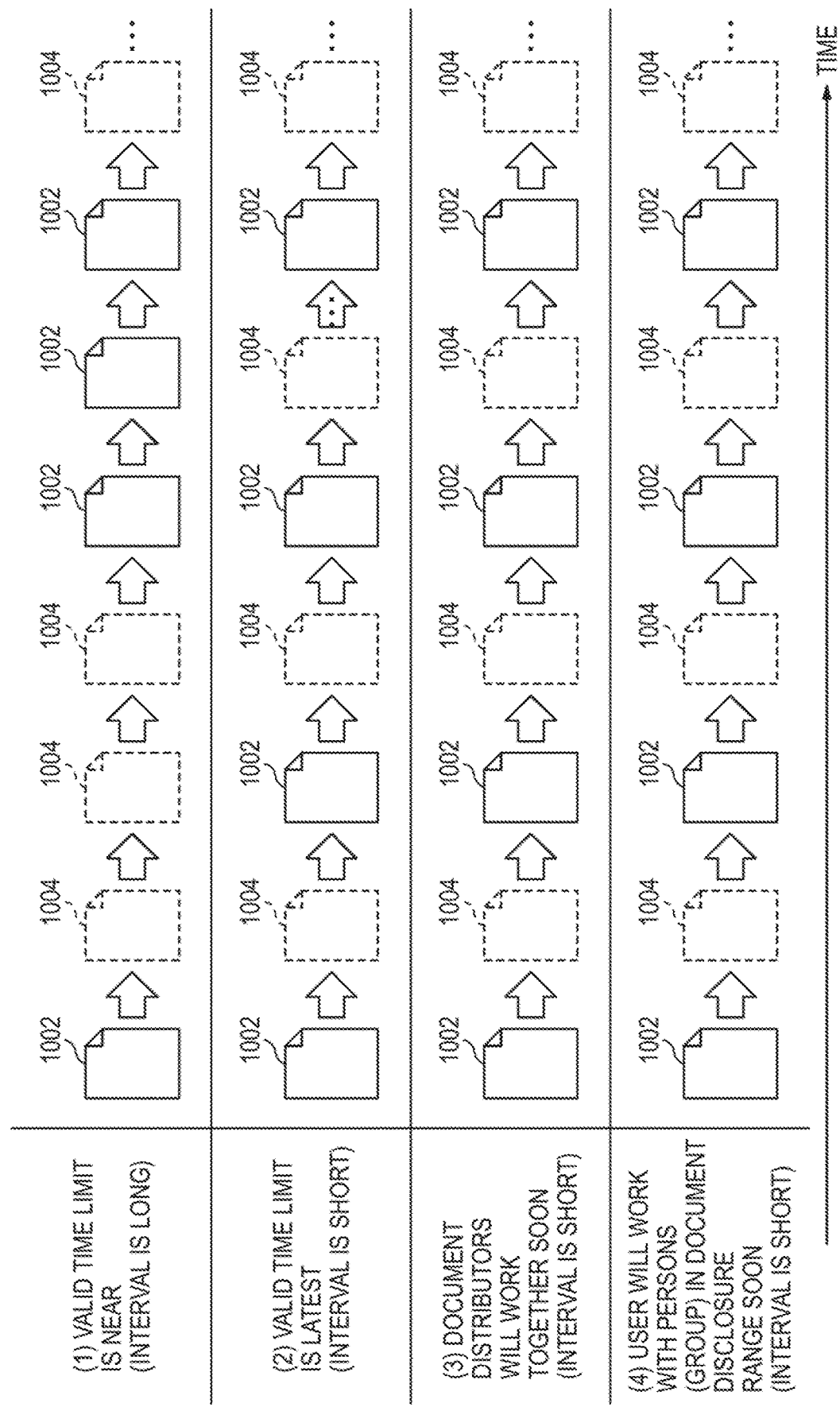
FIG. 10 is an explanatory view illustrating examples of a process according to this exemplary embodiment.

FIG. 10 is an explanatory view illustrating examples of a process according to this exemplary embodiment.

In FIG. 10, the example (1) is an example of a process according to the flowchart illustrated in the example of FIG. 3, the example (2) is an example of a process according to the flowchart illustrated in the example of FIG. 5, the example of (3) is an example of a process according to the flowchart illustrated in the example of FIG. 6, and the example of (4) is an example of a process according to the flowchart illustrated in the example of FIG. 9.

As illustrated in the example (1) in FIG. 10, in "the valid time limit of browsing is near", the document icons are displayed by being switched between normal and semi-transparent like a document icon (normal) 1002, a document icon (semi-transparent) 1004, the document icon (semitransparent) 1004, and the document icon (semi-transparent) 1004, the document icon (normal) 1002, the document icon (normal) 1002, the document icon (normal) 1002, the document icon (semi-transparent) 1004, and so on. The switching interval is made to be longer than in other cases.

As illustrated in the example (2) in FIG. 10, in "the valid time limit of browsing is latest", the document icons are displayed so that the switching interval between normal and semi-transparent becomes short like the document icon (normal) 1002, the document icon (semi-transparent) 1004, the document icon (normal) 1002, the document icon (semi-transparent) 1004 the document icon (normal) 1002, the document icon (semi-transparent) 1004, the document icon (normal) 1002, the document icon (semi-transparent) 1004, and so on.

As illustrated in the example of (3) in FIG. 10, in "the document distributors will work together soon", the document icons are displayed so that the switching interval between normal and semi-transparent becomes short like the document icon (normal) 1002, the document icon (semi-transparent) 1004, and the document icon (normal) 1002, the document icon (semi-transparent) 1004, the document icon (normal) 1002, the document icon (semi-transparent) 1004, the document icon (normal) 1002, the document icon (semi-transparent) 1004, and so on.

As illustrated in the example (4) in FIG. 10, in "the case where the user will work with persons (groups) in the document disclosure range soon", the document icons are displayed so that the switching interval between normal and semi-transparent becomes short like the document icon (normal) 1002, the document icon (semi-transparent) 1004, the document icon (normal) 1002, the document icon (semi-transparent) 1004, the document icon (normal) 1002, the document icon (semi-transparent) 1004, the document icon (normal) 1002, the document icon (semi-transparent) 1004, and so on.

Figure 11:
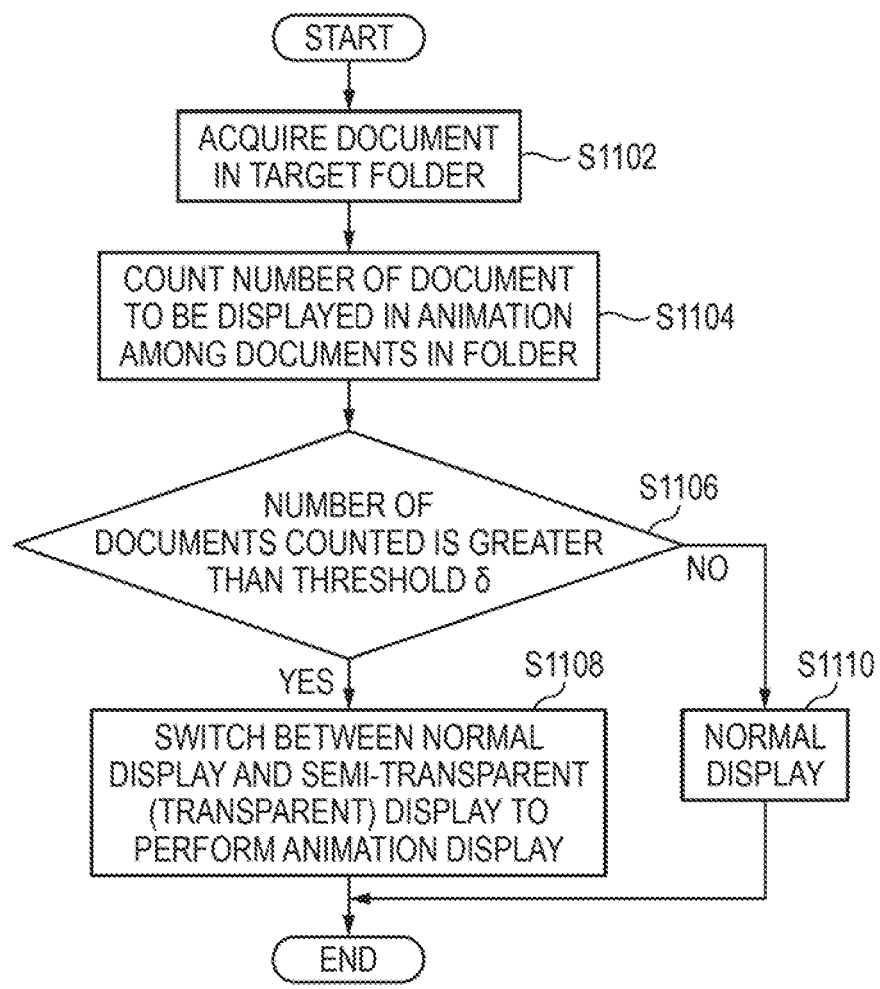
FIG. 11 is a flowchart illustrating an example of a process according to this exemplary embodiment.
Figure 12:
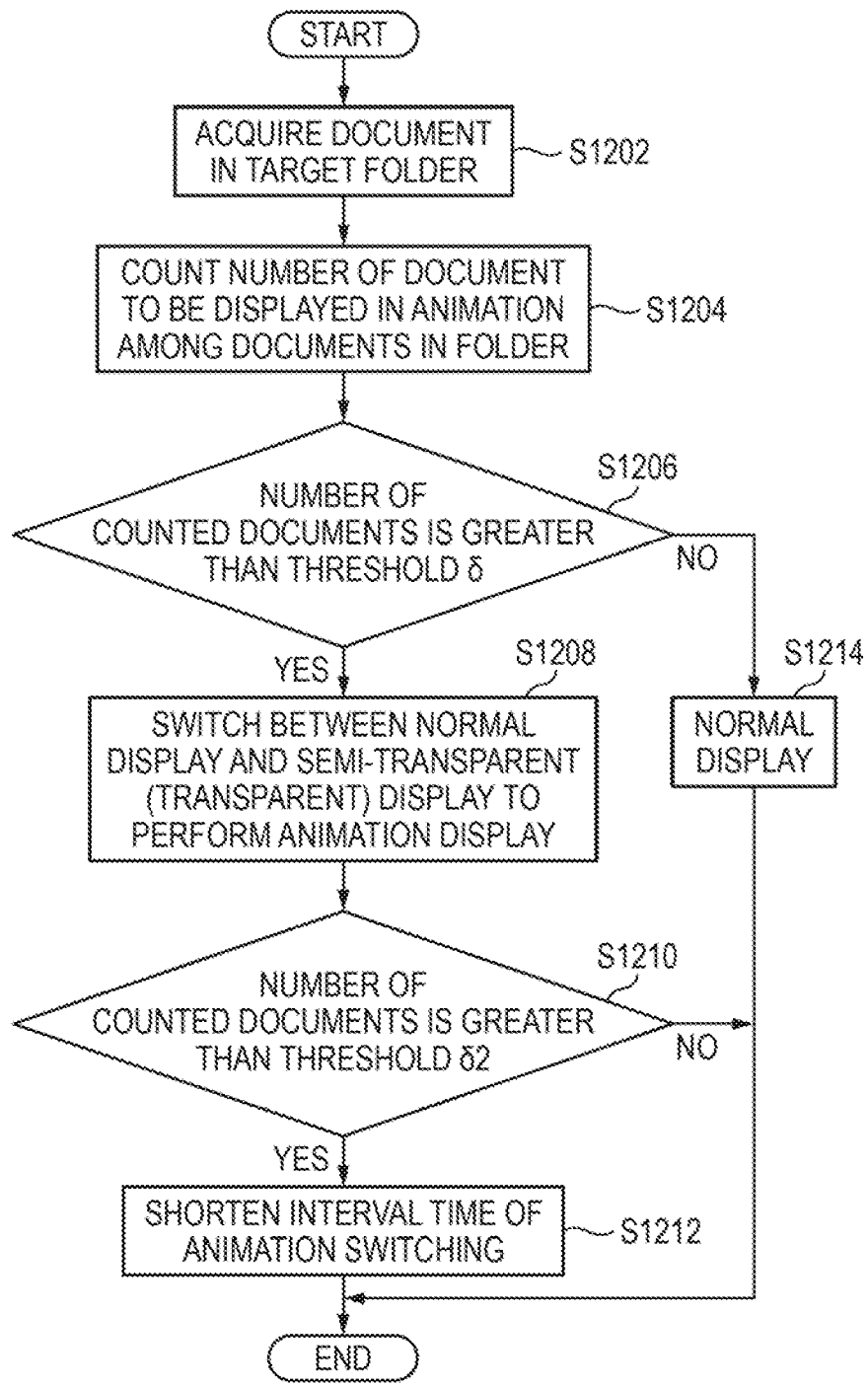
FIG. 12 is a flowchart illustrating an example of a process according to this exemplary embodiment.
Figure 13:
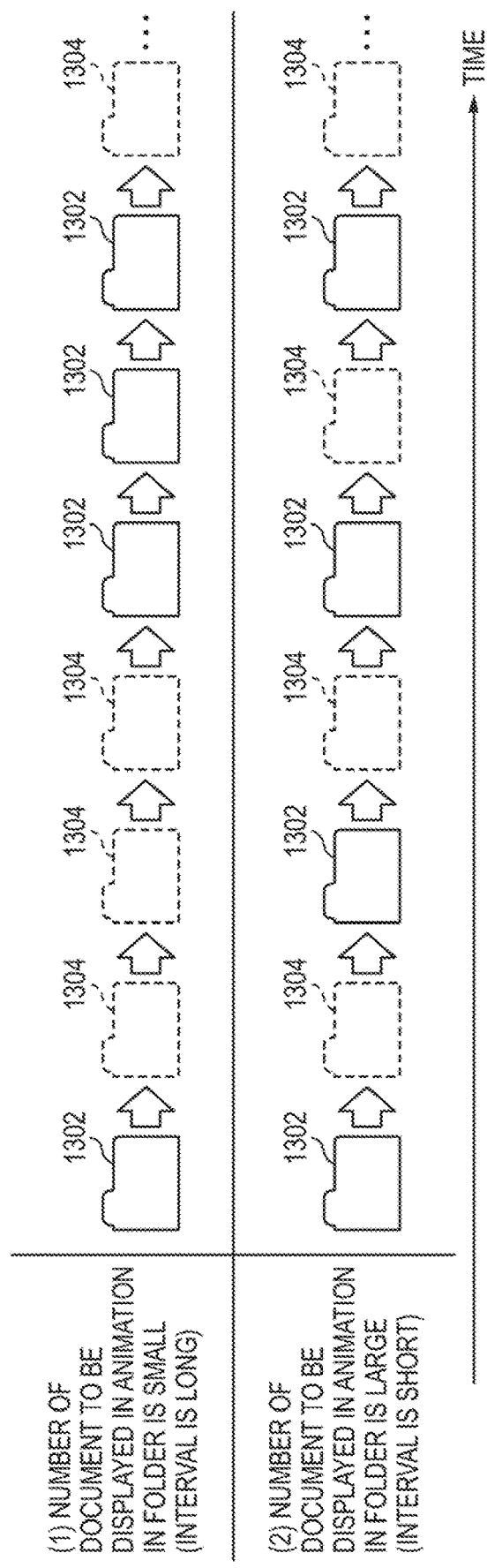
FIG. 13 is an explanatory view illustrating examples of a process according to this exemplary embodiment.

In the examples illustrated in FIGS. 11 to 13, it is determined whether or not to display an animation in a browsing state of a document in a folder.

FIG. 11 is a flowchart illustrating an example of a process according to this exemplary embodiment. A folder icon displayed on the display device is a target, and a folder icon not displayed on the display device is not the target.

In step S1102, a document in the folder displayed on the display device is acquired.

In step S1104, the number of documents to be displayed in animation is counted among the documents in the folder. Documents to be displayed in animation may be counted according to the flowcharts illustrated in the examples of FIGS. 3, 5, 6, and 9.

In step S1106, it is determined whether or not the number of counted documents is larger than a threshold $\delta$. When it is determined that the number of counted documents is larger than the threshold $\delta$, the process proceeds to step S1108, and otherwise the process proceeds to step S1110. A ratio to the number of documents in the target folder may be set as the threshold. Specifically, "it is determined whether or not the number of counted documents/the number of documents in the target folder) is larger than a threshold $\epsilon$" may be used.

In step S1108, the target folder is switched between normal display and semi-transparent (or transparent) display, and animation display is performed.

When the display mode of the folder is decided to be changed, a document which is stored in the folder and whose display mode has been changed (document switched between normal display and semi-transparent (or transparent) display) may be displayed in normal display.

When the number of counted documents exceeds the threshold $\alpha$, the folder may be displayed on a screen (for example, the screen of FIG. 19) displaying a list of documents and display of the documents stored in the folder may be stopped. That is, displaying the folder may be substituted for deletion of display on the screen of the document.

In step S1110, normal display is performed.

FIG. 12 is a flowchart illustrating an example of a process according to this exemplary embodiment. A folder icon displayed on the display device is a target, and a folder icon not displayed on the display device is not the target.

Processes of steps S1202 to S1208 and S1214 are equivalent to the processes of steps S1102 to S1110 of the flowchart illustrated in the example of FIG. 11.

In step S1202, the document in the folder displayed on the display device is acquired.

In step S1204, the number of documents to be displayed in animation is counted among the documents in the folder. Documents to be displayed in animation may be counted according to the flowcharts illustrated in the examples of FIGS. 3, 5, 6, and 9.

In step S1206, it is determined whether or not the number of counted documents is greater than the threshold $\delta$. When it is determined that the number of counted documents is greater than the threshold $\delta$, the process proceeds to step S1208, and otherwise the process proceeds to step S1214. A ratio to the number of documents in the target folder may be set as the threshold. Specifically, "It is determined whether or not the number of counted documents/the number of documents in the target folder) is larger, than the threshold $\epsilon$" may be used.

In step S1208, the target folder is switched between normal display and semi-transparent (or transparent) display, and animation display is performed.

In step S1210, it is determined whether or not the number of counted documents is greater than a threshold $\delta2$. When it is determined that the number of counted documents is greater than the threshold $\delta2$, the process proceeds to step S1212, and otherwise the process ends. The threshold $\delta2$ is a value larger than the threshold $\delta$. The ratio to the number of documents in the target folder may be set as the threshold. Specifically, "it is determined whether or not the number of counted documents the number of documents in the target folder) is larger than a threshold $\epsilon2$" may be used. The threshold $\epsilon2$ is a value larger than the threshold $\epsilon$.

In step S1212, the interval time of animation switching is shortened.

In step S1214, normal display is performed.

FIG. 13 is an explanatory view illustrating examples of a process according to, this exemplary embodiment.

In FIG. 13, the example (1) is an example of a process according to the flowchart illustrated in the example of FIG. 11, and the example (2) is an example of a process according to the flowchart illustrated in the example of FIG. 12.

As illustrated in the example (1) in FIG. 13, in "the number of documents to be displayed in animation in the folder is small", the folder icons are displayed by being switched between normal and semi-transparent like a folder icon (normal) 1302, a folder icon (semi-transparent) 1304, the folder icon (semi-transparent) 1304, the folder icon (semi-transparent) 1304 the folder icon (normal) 1302, the folder icon (normal) 1302, the folder icon (normal) 1302, the folder icon (semi-transparent) 1304, and so on. The switching interval is made to be longer than in other cases.

As illustrated in the example (2) in FIG. 13, in "the number of documents to be displayed in animation in the folder is large", the folder icons are switched between normal and semi-transparent and displayed so that the interval becomes short like the folder icon (normal) 1302, the folder icon (semi-transparent) 1304, the folder icon (normal) 1302, the folder icon (semi-transparent) 1304, the folder icon (normal) 1302, the folder icon (semi-transparent) 1304, the folder icon (normal) 1302, the folder icon (semi-transparent) 1304, and so on.

The examples illustrated in FIGS. 14 to 19 can cope with a case where there are many document icons to be displayed in animation.

Figure 14:
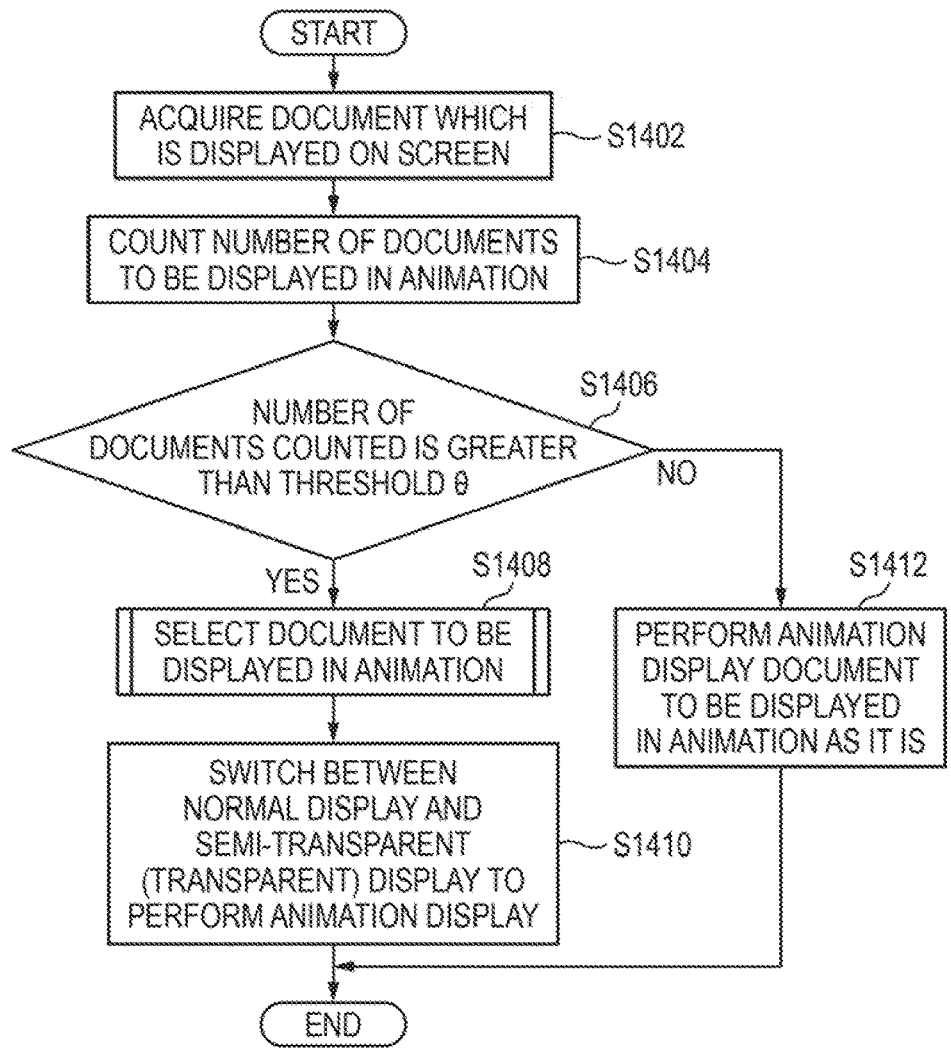
FIG. 14 is a flowchart illustrating an example of a process according to this exemplary embodiment.

FIG. 14 is a flowchart illustrating an example of a process according to this exemplary embodiment. If many document icons displayed on the display device are displayed in animation, it becomes a burden on a user's vision, making it difficult to determine which one to browse. Accordingly, when there are many document icons to be displayed in animation, the number of the document icons is reduced.

In step S1402, a document displayed on the screen is acquired.

In step S1404, the number of documents to be displayed in animation is counted. Documents to be displayed in animation may be counted according to the flowcharts illustrated in the examples of FIGS. 3, 5, 6, and 9.

In step S1406, it is determined whether or not the number of counted documents is larger than a threshold θ. When it is determined the number of counted documents is larger than a threshold θ, the process proceeds to step S1408, and otherwise the process proceeds to step S1412. A ratio of the number of counted documents to the number of documents displayed on the screen may be larger than, a threshold γ. Specifically, "it is determined whether or not, the number of counted documents/the number of documents displayed on the screen) is larger than the threshold A" may be used.

In step S1408, a document to be displayed in animation is selected. A detailed process of step S1408 may use any of the flowcharts illustrated in the examples of FIGS. 15 to 18 described later.

In step S1410, switching between normal display and semi-transparent (or transparent) display is performed and animation display is performed.

In step S1412, the document to be displayed in animation is displayed in animation as it is.

Figure 15:
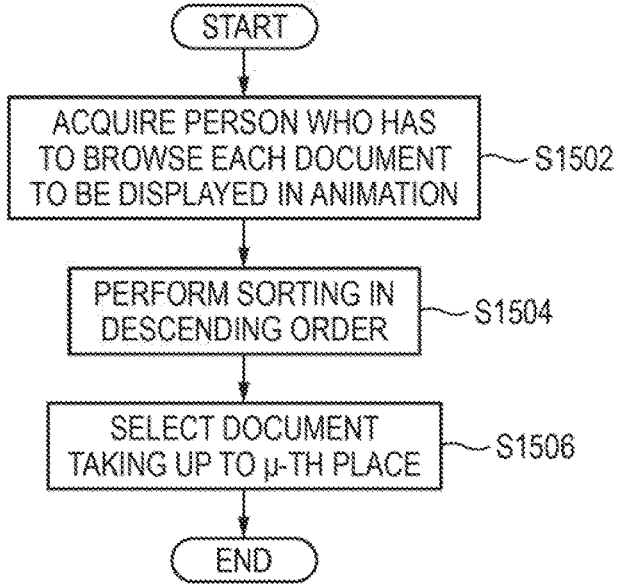
FIG. 15 is a flowchart illustrating an example of a process according to this exemplary embodiment.

FIG. 15 is a flowchart illustrating an example of a process according to this exemplary embodiment.

In step S1502, a person who has to browse each document to be displayed in animation is acquired.

In step S1504, sorting is performed in descending order by the number of persons who have to browse each document.

In step S1506, documents taking up to μ-th place are selected. That is, the document icons that many people have to browse are targeted to be displayed in animation.

Figure 16:
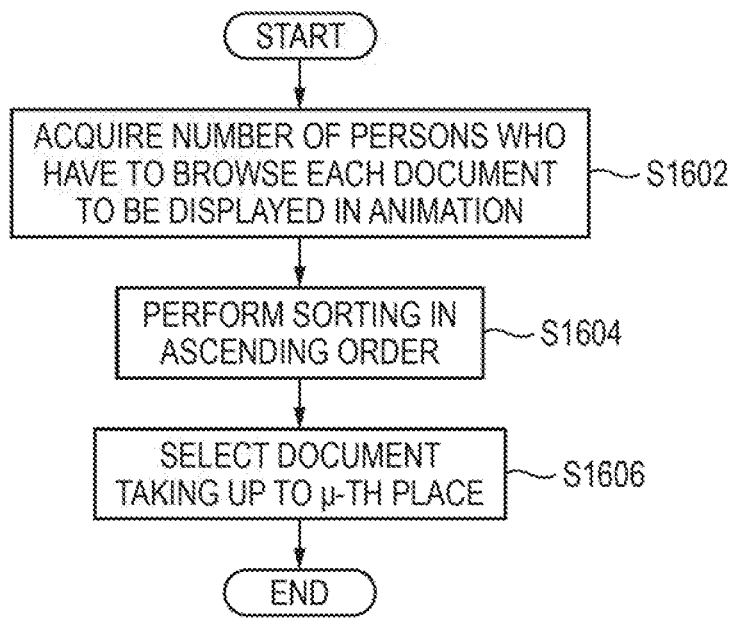
FIG. 16 is a flowchart illustrating an example of a process according to this exemplary embodiment.

FIG. 16 is a flowchart illustrating an example of a process according to this exemplary embodiment.

In step S1602, the number of persons who have browsed each document displayed in animation is acquired.

In step S1604, sorting is performed in ascending order by the number of persons who have browsed each document.

In step S1606, documents taking up to p-th place are selected. That is, the document icons that many people have already browsed are the targets to be displayed in animation.

Figure 17:
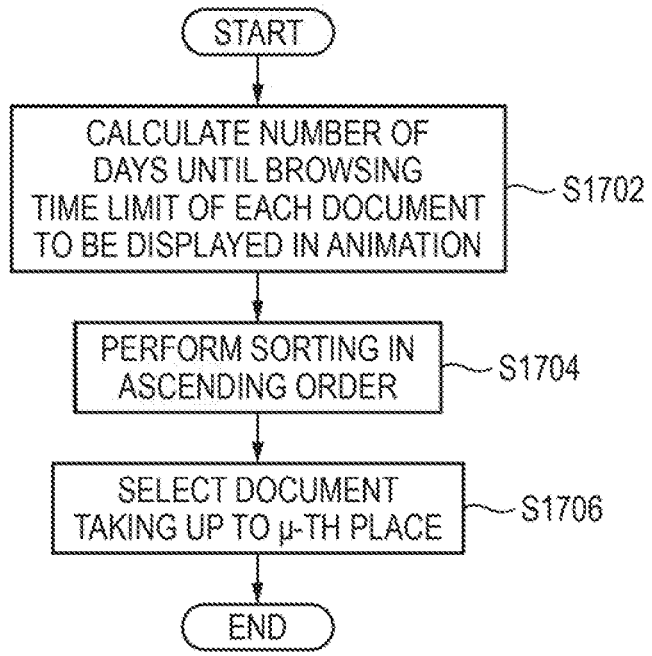
FIG. 17 is a flowchart illustrating an example of a process according to this exemplary embodiment.

FIG. 17 is a flowchart illustrating an example of a process according to this exemplary embodiment.

In step S1702, the number of days until the browsing time limit of each document to be displayed in animation is calculated. Specifically, the remaining number of days from today to the date of the browsing time limit field 435 of the document management table 400 may be calculated.

In step S1704, sorting is performed in ascending order by the remaining number of days.

In step S1706, documents taking up to p-th place are selected. That is, the document icons that many people have already browsed are the targets to be displayed in animation.

Figure 18:
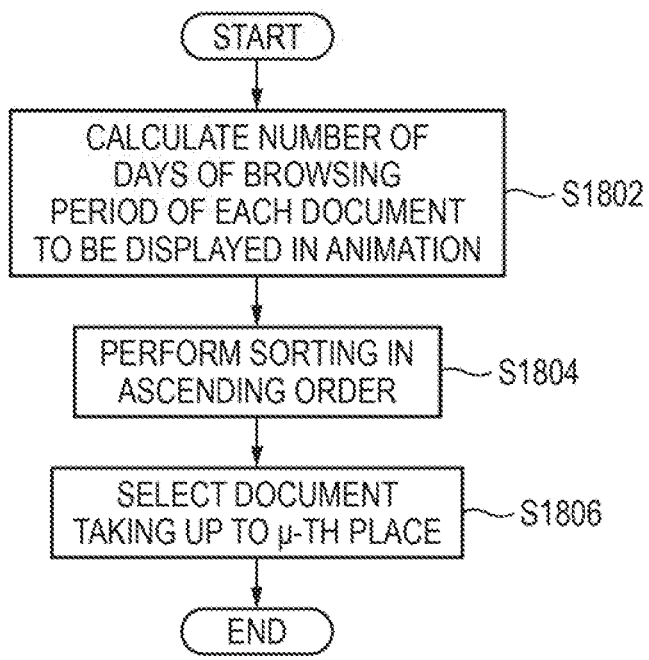
FIG. 18 is a flowchart illustrating an example of a process according to this exemplary embodiment.

FIG. 18 is a flowchart illustrating an example of a process according to this exemplary embodiment.

In step S1802, the number of days of the browsing period of each document to be displayed in animation is calculated. Specifically, the number of days between the date in the distribution date and time field 430 of the document management table 400 and the date in the browsing time limit field 435 may be calculated.

In step S1804, sorting is performed in ascending order by the number of days.

In step S1806, documents taking up to μ-th place are selected. That is, the document icons with a short browsing time limit are the targets to be displayed in animation.

Figure 19:
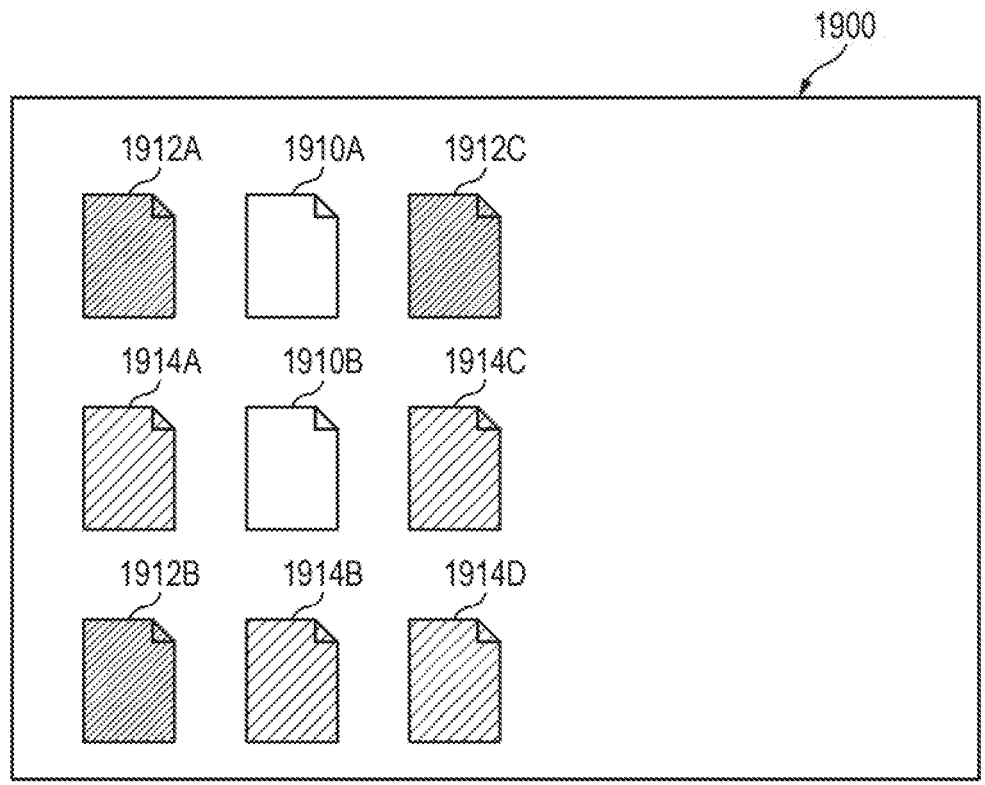
FIG. 19 is an explanatory view illustrating an example of a process according to this exemplary embodiment.

FIG. 19 is an explanatory view illustrating an example of a process according to this exemplary embodiment. FIG. 19 illustrates an example of a process according to the flowchart illustrated in the example of FIG. 14.

On a screen 1900, nine document icons are displayed. Illustration is made in such a way that nine document icons are divided into three display tirades (normal display, animation display, animation display target but normal display). As the document icons that are originally animation display target but normal display, three document icons are displayed. As the document icons that are animation display, four document icons are displayed. Specifically, a document icon (animation display target but normal display) 1912A, a document icon (animation display) 1914A, a document icon (animation display target but normal display) 1912B, a document icon (normal display) 1910A, a document icon (normal display) 1910B, a document icon (animation display) 1914B, a document icon (animation display target but normal display) 1912C, a document icon (animation display) 1914C, and a document icon (animation display) 1914D are displayed.

In the examples illustrated in FIGS. 20 to 24, it is determined whether or not to perform animation display in a browsing state of plural documents (target document and document of a link destination in the target document).

Figure 20:
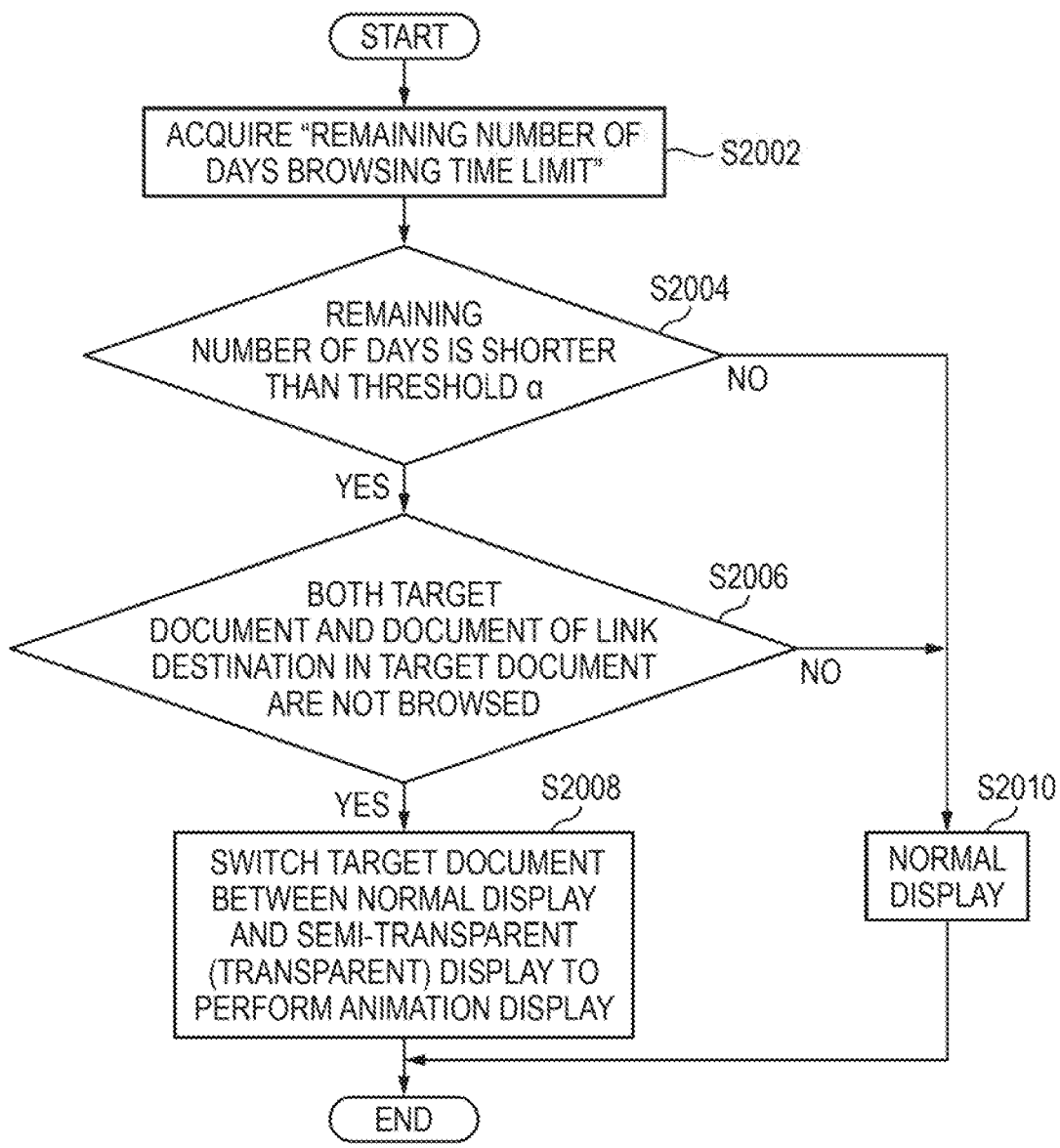
FIG. 20 is a flowchart illustrating an example of a process according to this exemplary embodiment.

FIG. 20 is a flowchart illustrating an example of a process according to this exemplary embodiment.

In step S2002, the remaining number of days of the browsing time limit for the displayed document icon is acquired.

In step S2004, it is determined whether or not the remaining number of days is shorter than the threshold α. When it is determined whether that the remaining number of days is shorter than the threshold α, the process proceeds to step S2006, and otherwise the process proceeds to step S2010.

In step S2006, it is determined whether or not both the target document and the document of the link destination in the target document are not browsed. When it is determined that both the target document and the document are not browsed, the process proceeds to step S2008, and otherwise the process proceeds to step S2010.

In step S2008, the target document is switched between normal display and semi-transparent (or transparent) display, and animation display is performed.

In step S2010, normal display is performed.

Figure 21:
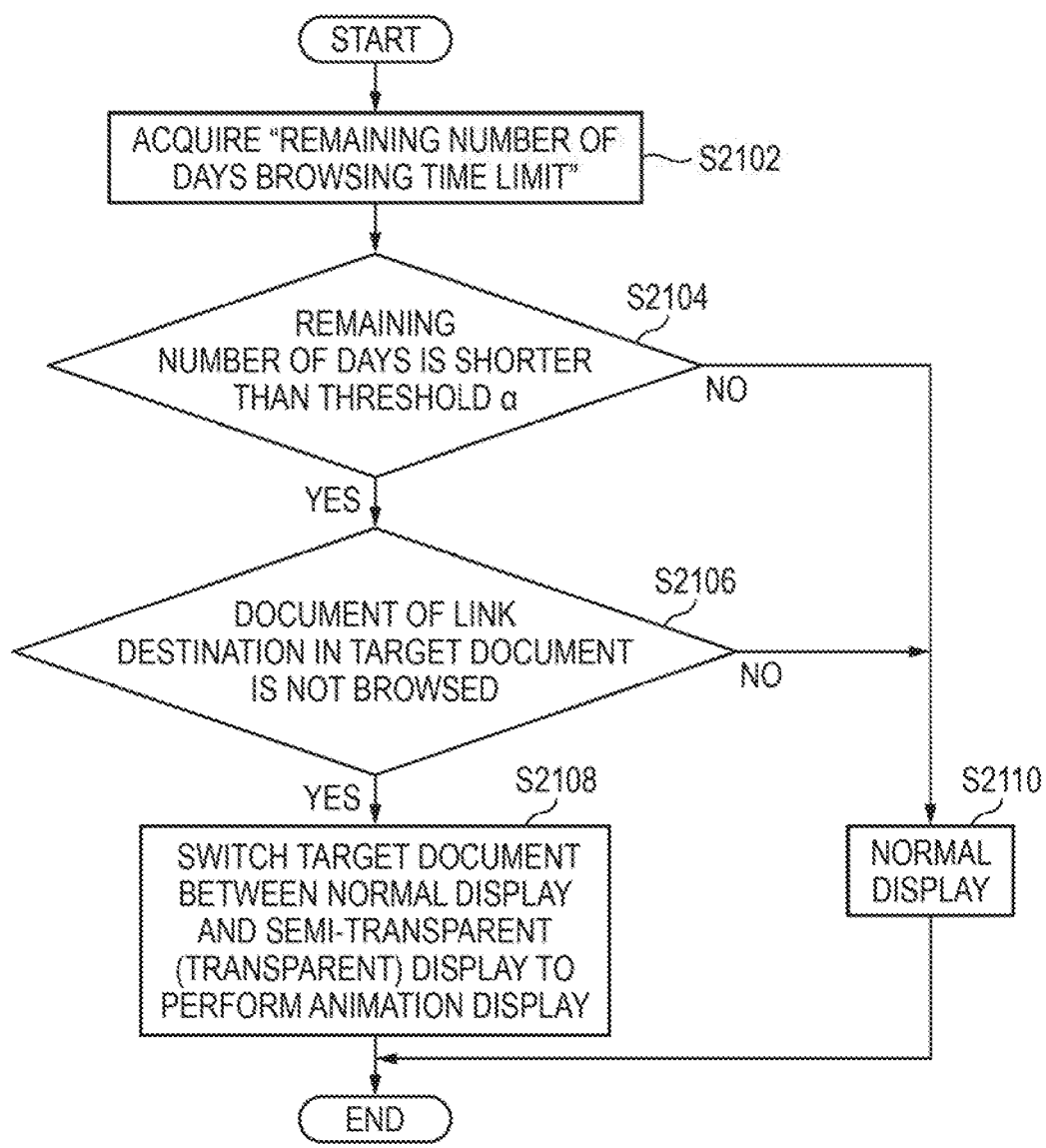
FIG. 21 is a flowchart illustrating an example of a process according to this exemplary embodiment.

FIG. 21 is a flowchart illustrating an example of a process according to this exemplary embodiment.

In step S2102, the remaining number of days of the browsing time limit for the displayed document icon is acquired.

In step S2104, it is determined whether or not the remaining number of days is shorter than the threshold $\alpha$. When it is determined that the remaining number of days is shorter than the threshold $\alpha$, the process proceeds to step S2106, and otherwise the process proceeds to step S2110.

In step S2106, it is determined whether or not the document of the link destination in the target document is not browsed. When it is determined that the document of the link destination is not browsed, the process proceeds to step S2108, and otherwise the process proceeds to step S2110. All documents (documents that have been browsed and documents that have not yet been browsed) are targets.

In step S2108, the target document is switched between normal display and semi-transparent (or transparent) display, and animation display is performed.

In step S2110, normal display is performed.

Figure 22:
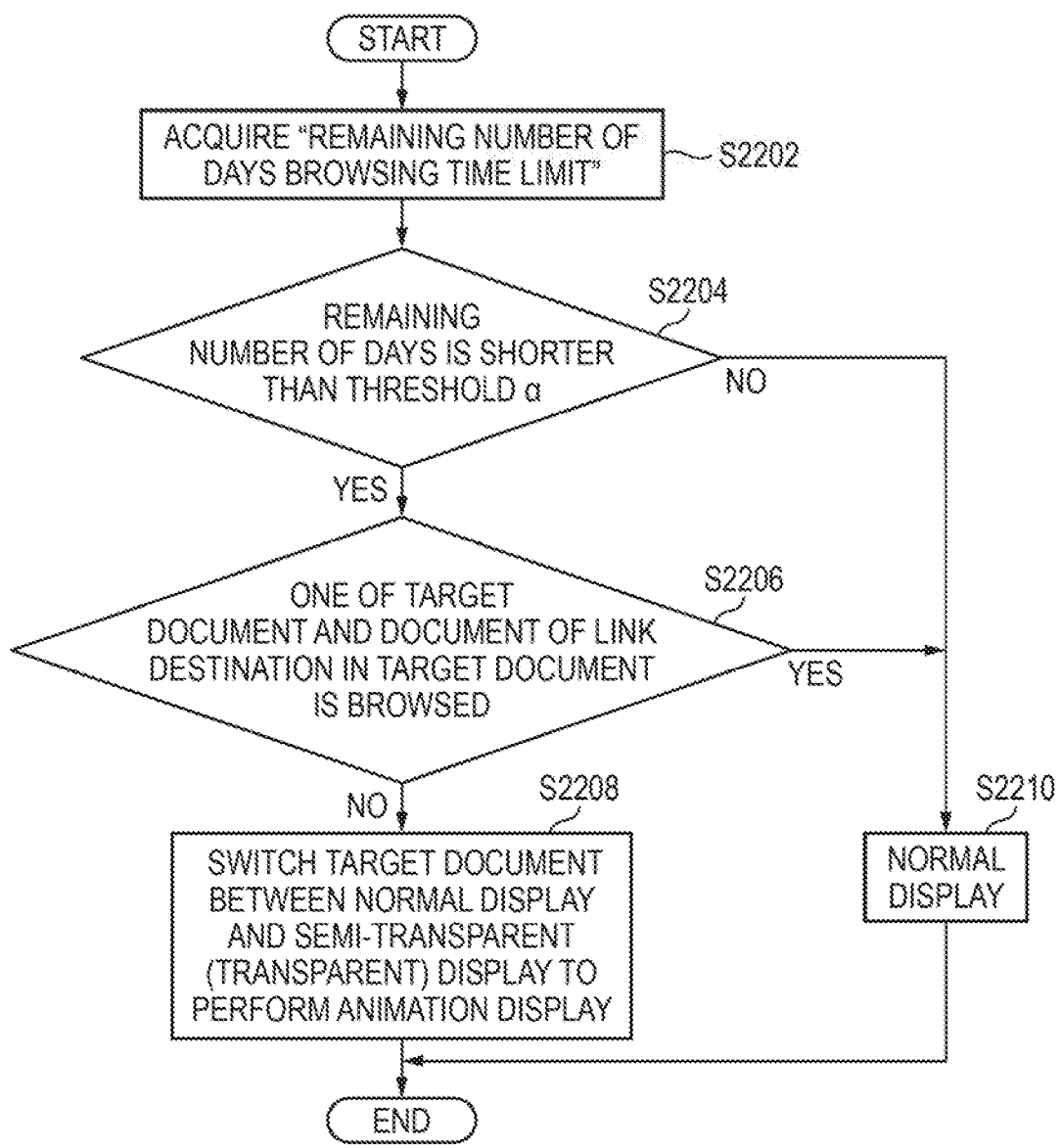
FIG. 22 is a flowchart illustrating an example of a process according to this exemplary embodiment.

FIG. 22 is a flowchart illustrating an example of a process according to this exemplary embodiment.

In step S2202, the remaining number of days of the browsing time limit for the displayed document icon is acquired.

In step S2204, it is determined whether or not the remaining number of days is shorter than the threshold $\alpha$. When it is determined that the remaining number of days is shorter than the threshold $\alpha$, the process proceeds to step S2206, and otherwise the process proceeds to step S2210.

In step S2206, it is determined whether or not one of the target document and the document of the link destination in the target document is browsed. When it is determined that one of the target document and the document is browsed, the process proceeds to step S2210, and otherwise the process proceeds to step S2208.

In step S2208, the target document is switched between normal display and semi-transparent (or transparent) display, and animation display is performed.

In step S2210, normal display is performed.

Figure 23:
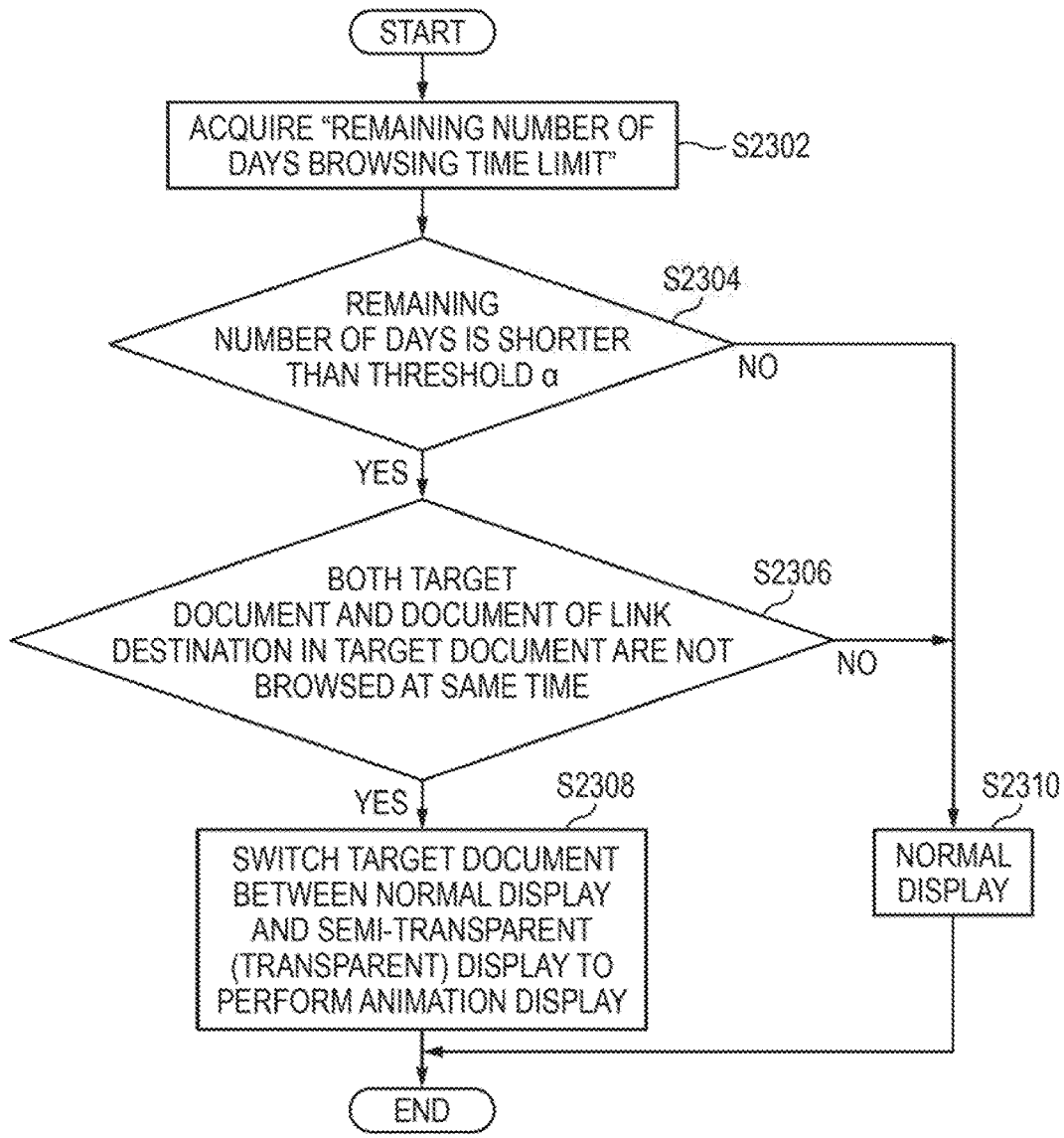
FIG. 23 is a flowchart illustrating an example of a process according to this exemplary embodiment.

FIG. 23 is a flowchart illustrating an example of a process according to this exemplary embodiment.

In step S2302, the remaining number of days of the browsing time limit for the displayed document icon is acquired.

In step S2304, it is determined whether or not the remaining number of days is shorter than the threshold $\alpha$. When it is determined that the remaining number of days is shorter than the threshold $\alpha$, the process proceeds to step S2306, and otherwise the process proceeds to step S2310.

In step S2306, it is determined whether or not both the target document and the document of the link destination in the target document are not browsed at the same time. When it is determined that both the target document and the document are not browsed at the same time, the process proceeds to step S2308, and otherwise the process proceeds to step S2310.

In step S2308, the target document is switched between normal display and semi-transparent (or transparent) display, and animation display is performed.

In step S2310, normal display is performed.

Figure 24:
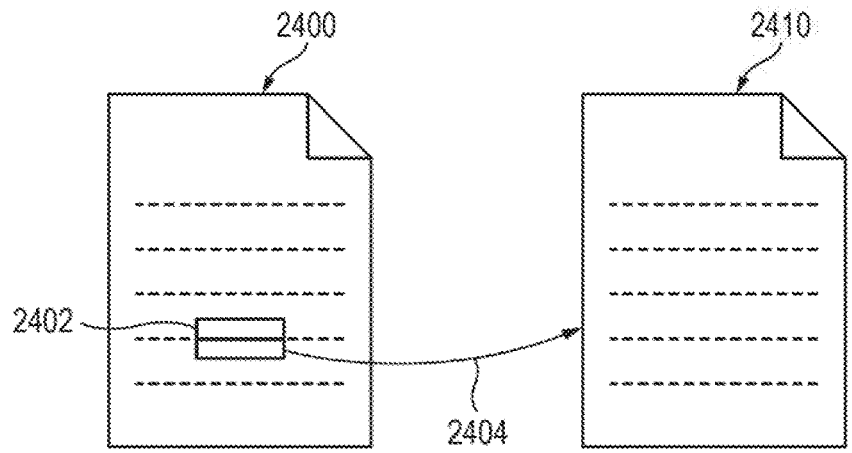
FIG. 24 is an explanatory view illustrating an example of a process according to this exemplary embodiment.

FIG. 24 is an explanatory view illustrating an example of a process according to this exemplary embodiment.

FIG. 24 illustrates a target document and a document of a link destination in the target document. A target document 2400 is an example of a target document, and a document 2410 is an example of the document of the link destination. The target document 2400 includes a reference tagged document name character string 2402, and when the reference tagged document name character string 2402 is selected by the user, the document 2410 linked by the reference tagged document name character string 2402 is displayed.

"Both the target document and the document of the link destination in the target document are not browsed" in step S2006 in the flowchart illustrated in the example of FIG. 20 means that both the target document 2400 and the document 2410 are not browsed.

"The document of the link destination in the target document is not browsed" in step S2106 in the flowchart illustrated in the example of FIG. 21 means that the document 2410 is not browsed.

"One of the target document and the document of the link destination in the target document are browsed" in step S2206 in the flowchart illustrated in the example of FIG. 22 means that any one of the tamer document 2400 and the document 2410 is browsed.

"Both the target document and the document of the link destination in the target document are not browsed, at the same time" in step S2306 in the flowchart illustrated in the example of FIG. 23 means that both the target document 2400 and the document 2410 are not browsed at the same time (within one screen). Even if both the target document 2400 and the document 2410 are browsed, when the target document 2400 and the document 2410 are not browsed at the same time, the target document 2400 and the document 2410 are targeted for animation display.

Figure 25:
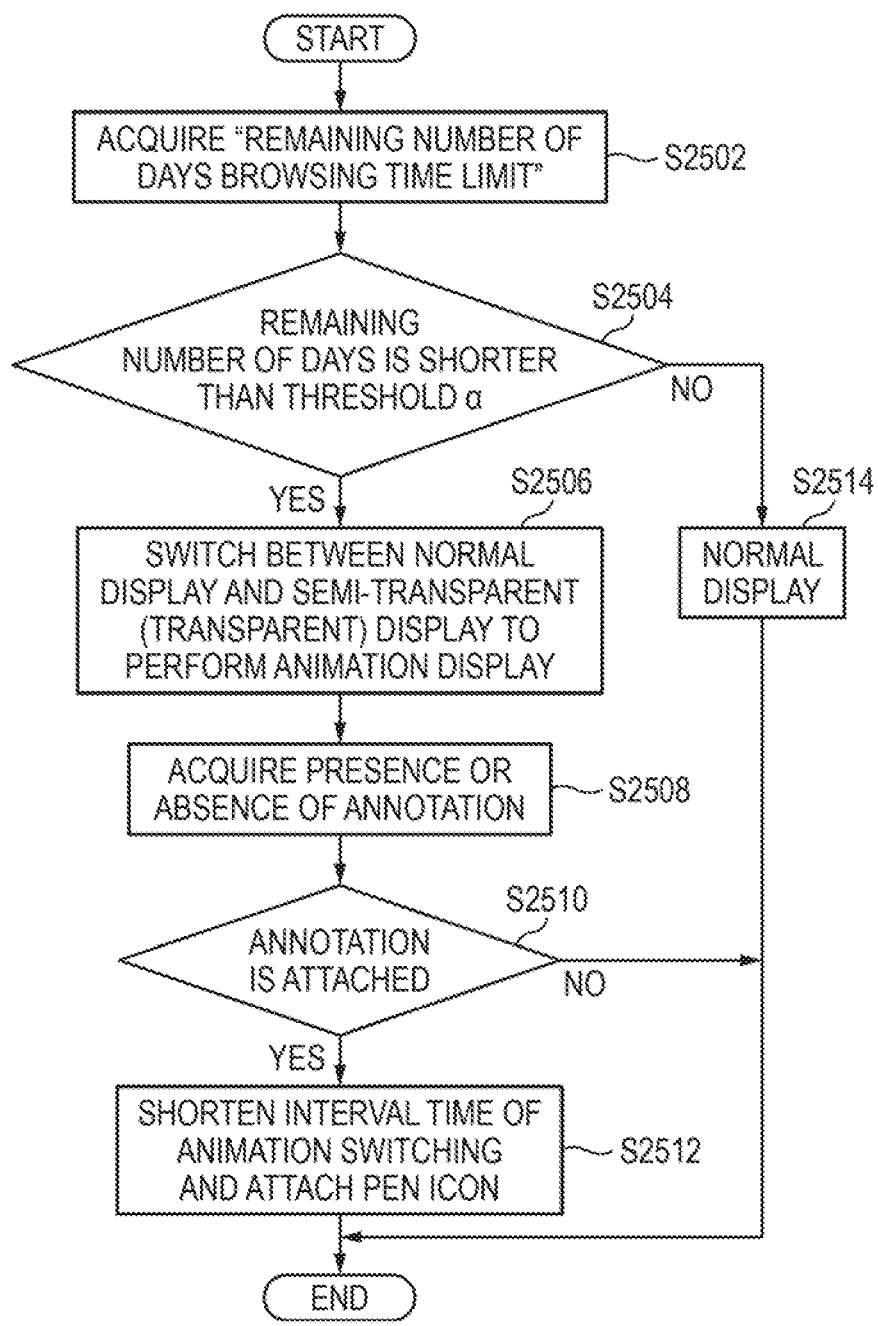
FIG. 25 is a flowchart illustrating an example of a process, according to this exemplary embodiment.
Figure 26:
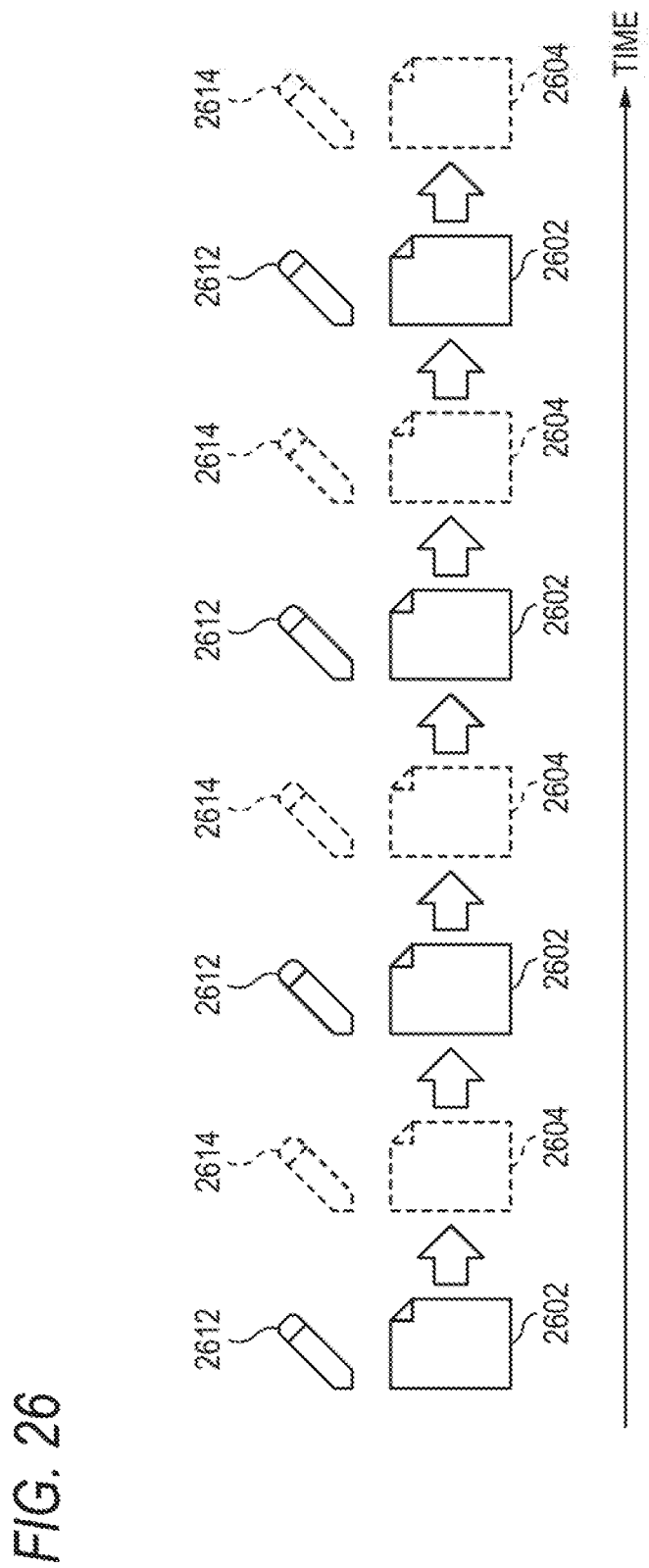
FIG. 26 is an explanatory view of an example of a process according to this exemplary embodiment.

The examples illustrated in FIG. 25 and FIG. 26 relate to an animation, display process when writing is made to the document, FIG. 25 is a flowchart illustrating an example of a process according to this exemplary embodiment.

In step S2502, the remaining number of days of the browsing time limit for the displayed document icon is acquired.

In step S2504, it is determined whether or not the remaining number of days is shorter than the threshold $\alpha$. When it is determined that the remaining number of days is shorter than the threshold $\alpha$, the process proceeds to step S2506, and otherwise the process proceeds to step S2514.

In step S2506, display is switched between normal display and semi-transparent (or transparent) display and animation display is performed.

In step S2508, the presence or absence of annotation is acquired.

In step S2510, it is determined whether or not an annotation is attached. When it is determined that the annotation is attached, the process proceeds to step S2512, and otherwise the process ends.

In step S2512, the interval time of animation switching is shortened, and a pen icon is also attached.

In step S2514, normal display is performed.

FIG. 26 is an explanatory view of an example of a process according to this exemplary embodiment.

Writing to the document corresponds to new writing to the document, addition of an annotation (such as an electronic tag), and the like, ft can be said that importance of browsing of such document is increasing. The interval time of animation switching of such a document is shortened, and a pen icon indicating that writing is made is also attached. The time when writing is made may be limited to the time after distribution of the document, or may be limited to the time after creation of the document.

Specifically, a pen icon (normal) 2612 is attached to a document icon (normal) 2602, and a state of the document icon (normal) 2602 and the pen icon (normal) 2612 and a state of a document icon (semi-transparent) 2604 and the pen icon (semi-transparent) 2614 states are alternately displayed. The interval of switching is also shortened.

Figure 27:
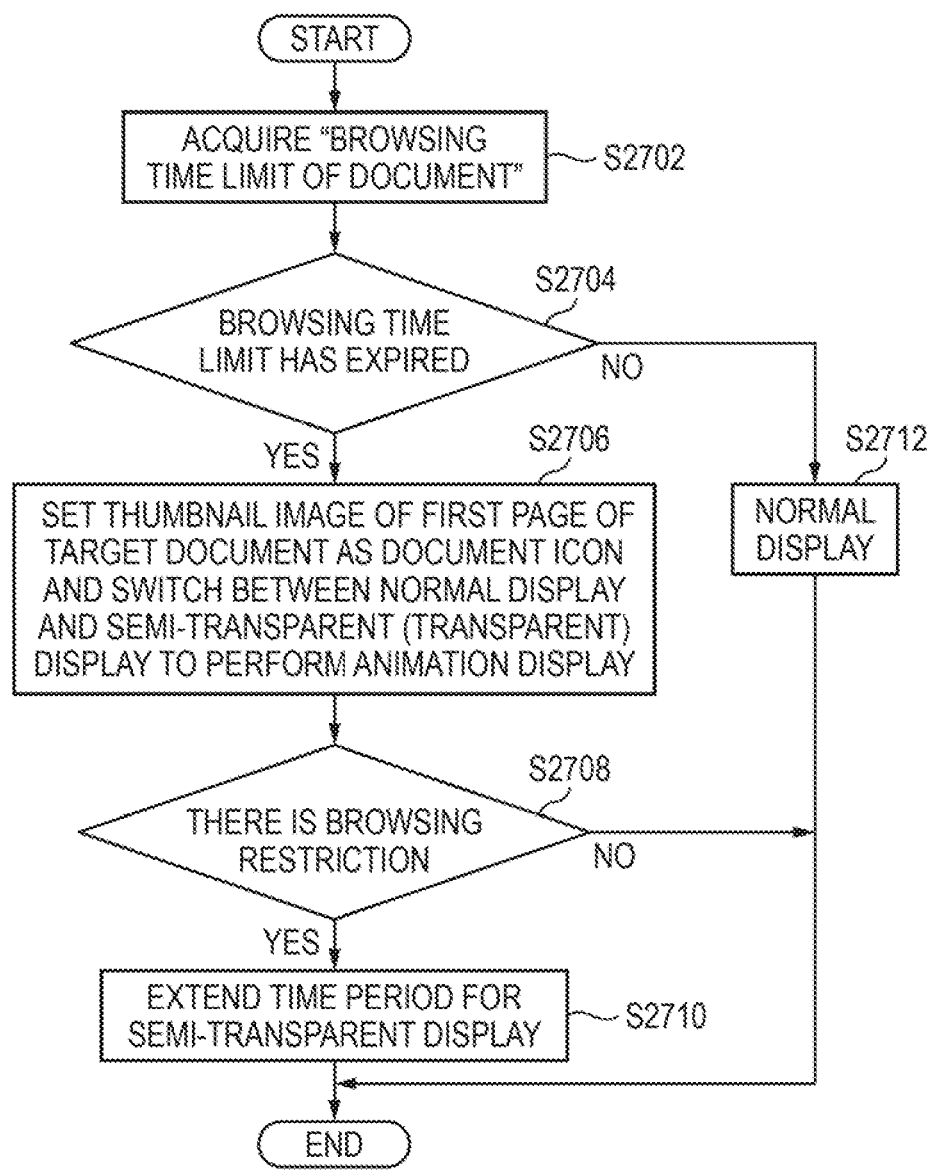
FIG. 27 is a flowchart illustrating an example of a process, according to this exemplary embodiment.

The examples illustrated in FIGS. 27 and 28 relate to an animation display process when the document browsing time limit has passed. Even after the document browsing time limit has passed, it may be possible to display the document instead of deleting the document immediately. This is because there is a case where the user wants to browse the document again after the browsing time limit has passed. Then, there is an occasion where the user wants to request browsing authority for a document whose browsing time limit has passed.

In this case, by displaying the document icon in which the first page of the document is made into a thumbnail, it becomes easy to understand that the document the user wants to request to browse is "it is certainly this document". However, even when a malicious third party peeks, it will give clues to guess the contents of the document. Therefore, animation is displayed so that the contents cannot be guessed by a short glance. Then, according to the state of "browsing authority to the document", the time during which the document is being semi-transparent is increased or decreased.

For example, when the user has the browsing authority to the document, the time of the semitransparent state may be made longer. In addition, as the document browsing authority is stricter (for example, "the range of disclosure is narrow", "only a person having high-level job position can view", and the like), the time for semi-transparent may be made longer.

With this configuration, it is still possible for users who have already browsed the document to make a determination (although it is information about clues), but it makes the document difficult to be read by a malicious third party who browses the document for the first time (because of necessity for serious browsing).

FIG. 27 is a flowchart illustrating an example of a process according to this exemplary embodiment.

In step S2702, a browsing time limit of the document is acquired.

In step S2704, it is determined whether or not the browsing time limit has expired. When it is determined that the browsing time limit has passed, the process proceeds to step S2706, and otherwise the process proceeds to step S2712.

In step S2706, the thumbnail image of the first page of the target document is used as a document icon, switching between normal display and semi-transparent (or transparent) display is performed, and animation display is performed.

In step S2708, it is determined whether or not there is browsing restriction. When it is determined that there is the browsing restriction, the process proceeds to step S2710, and otherwise the process ends.

In step S2710, the time for semi-transparent display is extended.

In step S2712, normal display is performed.

FIG. 28 is an explanatory view illustrating examples of a process according to this exemplary embodiment.

As illustrated in the example (1I) in FIG. 28, in "the case where there is no browsing restriction on the document", the document thumbnail icons are displayed in normal display and semi-transparent display alternately t like a document thumbnail icon (normal) 2802, a document thumbnail icon (semi-transparent) 2804, the document thumbnail icon (normal) 2802, the document thumbnail icon (semi-transparent) 2804, the document thumbnail icon (normal) 2802, the document thumbnail icon (semi-transparent) 2804, the document thumbnail icon (normal) 2802, the document thumbnail icon (semi-transparent) 2804, and so on.

As illustrated in the example (2) in FIG. 28, in the "case where there is browsing restriction on the document", the document thumbnail icons are displayed like the document thumbnail icon (normal) 2802, the document thumbnail icon (semi-transparent) 2804, the document thumbnail icon (semi-transparent) 2804, the document thumbnail icon (normal) 2802, the document thumbnail icon (normal) 2802, the document thumbnail icon (semi-transparent) 2804, document thumbnail icon (semi-transparent) 2804, the document thumbnail icon (normal) 2802, and so on, such that the time period during which the semi-transparent display mode is applied is extended.

As illustrated in the example (3) in FIG. 28, in the "case where the document browsing restriction is strict (for example, "the range of disclosure is narrow", "only a person having high-level job position can view", and the like)", the document thumbnail icons are displayed like the document thumbnail icon (normal) 2802, the document thumbnail icon (semi-transparent) 2804, the document thumbnail icon (semi-transparent) 2804, the document thumbnail icon (semi-transparent) 2804, the document thumbnail icon (normal) 2802, the document thumbnail icon (semi-transparent) 2804 the document thumbnail icon (semi-transparent) 2804, the document thumbnail icon (semi-transparent) 2804, and so on, such that the time period during which the semi-transparent display mode is applied is further extended, which results in relatively short time period during which the normal display mode is applied.

An example of a hardware configuration of the information processing apparatus 100 according to this exemplary embodiment will be described with reference to FIG. 29. The configuration illustrated in FIG. 29 is configured by, for example, a personal computer (PC) or the like, and illustrates an example of a hardware configuration including a data read unit 2917 such as a scanner and a data output unit 2918 such as a printer.

A central processing unit (CPU) 2901 is a control unit that executes a process according to a computer program in which an execution sequence of various modules described in the exemplary embodiment described above, that is, each module such as the time limit management module 115 and the display module 120 is described.

A read only memory (ROM) 2902 stores a program, operation parameters, and the like used by the CPU 2901. A random access memory (RAM) 2903 stores a program used in execution of the CPU 2901 and parameters that appropriately change in the execution and the like in the execution. These components are mutually connected by a host bus 2904 configured by a CPU bus and the like.

The host bus 2904 is connected to an external bus 2906 such as a peripheral component interconnect/interface (PCI) bus through a bridge 2905.

A keyboard 2908 and a pointing apparatus 2909 such as a mouse are devices operated by an operator. The display 2910 is a liquid crystal display device, a cathode ray tube (CRT), and the like, and displays various information as text or image information. A touch screen or the like provided with functions of both the pointing apparatus 2909 and the display 2910 may be employed. In this case, the realization of the function of the keyboard, the keyboard (also known as so-called software keyboard, screen keyboard, and the like) may be drawn by software on the screen (touch screen) to realize the keyboard function without being physically connected as in the keyboard 2908.

A hard disk drive (HDD) 2911 incorporates a hard disk (which may be a flash memory or the like), drives the hard disk, and allows the program to be executed by the CPU 2901 or information to be recorded or reproduced. The HDD 2911 realizes functions as the document management module 105, the user management module 110, and the like. Furthermore, various types of other data, various computer programs, and the like are stored.

The drive 2912 reads data or a program recorded on a removable recording medium 2913 such as a magnetic disk, an optical disk, a magneto-optical disk, and a semiconductor memory that are mounted and supplies the data or program to the RAM 2903 connected through an interface 2907, the external bus 2906, the bridge 2905, and the host bus 2904. The removable recording medium 2913 may also be used as a data recording area.

A connection port 2914 is a port for connecting the external connection apparatus 2915, and includes a connection unit such as USB or IEEE 1394. The connection port 2914 is connected to the CPU 2901 and the like through the interface 2907, the external bus 2906, the bridge 2905, the host bus 2904, and the like. A communication unit 2916 is connected to a communication channel and executes data communication processing with the outside. The data read unit 2917 is, for example, a scanner, and executes a document reading process. The data output unit 2918 is, for example, a printer, and executes a document data outputting process.

An exemplary embodiment for the computer program among the exemplary embodiments described above, a system having this hardware configuration is caused to read a computer program which is software and software and hardware resources cooperate, thereby realizing the exemplary embodiment described above.

The hardware configuration of the information processing apparatus 100 illustrated, in FIG. 29 is an example of one configuration. This exemplary embodiment is not limited to the configuration illustrated in FIG. 29, and any configuration in which the modules described in this exemplary embodiment are capable of being executed may be adopted. For example, some modules may be configured by dedicated hardware (for example, an application specific integrated circuit (ASIC) or a field-programmable gate array (FPGA)), some modules may be in an external system and connected by communication channels, and furthermore, plural systems illustrated in FIG. 29 may be connected to one another by communication channels and may cooperate with one another. Particularly, in addition to a personal computer, the modules may be incorporated in a portable information communication device (including a portable telephone, smart phone, mobile device, wearable computer, and the like), a home information appliance, a robot, a copying machine, a facsimile, a scanner, a printer, and a multifunction machine (image processing apparatus having any two or more functions such as the scanner, printer, copying machine, facsimile, and the like).

In the comparison process in the description of the exemplary embodiment described above, terms of "greater than or equal to", "less than or equal to", "larger than", and "smaller than (less than)" are illustrative terms, and as long as there is no contradiction in the combination thereof, those terms may be used as the terms of "larger than," "smaller than (less than)," "greater than or equal to", and "less than or equal to", respectively.

The program described above may be provided by being stored in a recording medium, or the program may be provided by communication unit. In this case, for example, the program described above may be regarded as an invention of "a computer-readable recording medium having a program recorded thereon".

The "computer-readable recording medium having a program recorded therein" refers to a computer-readable recording medium having a program recorded thereon, which is used for program installation, execution, program distribution, and the like.

The recording medium includes, for example, digital versatile discs (DVDs) such as "DVD-R, DVD-RW, DVD-RAM, and the like" which are standards formulated in the DVD Forum, and "DVD+R, DVD+RW, and the like" which are standards formulated in DVD+RW, compact discs (CDs) such as read only memory (CD-ROM), CD recordable (CD-R), CD rewritable (CD-RW), and the like, a Blu-ray (registered trademark) disc, a magneto-optical disk (MO), a flexible disk (FD), a magnetic tape, a hard disk, a read only memory (ROM), an electrically erasable and rewritable read only memory (EEPROM (registered trademark)), a flash memory, a random access memory (RAM), a secure digital (SD) memory card, and the like.

The whole or a pan of the program may be recorded on the recording medium to be stored, distributed or the like. The whole or a part of the program may be transmitted by communication using, for example, a transmission medium of a wired network used for a local area network (LAN), metropolitan area network (MAN), wide area network (WAN), the Internet, Intranet, Extranet, and the like, a wireless communication network, or a combination of these, or may be carried on a carrier wave.

Furthermore, the program may be apart or the whole of another program, or may be recorded on a recording medium together with a separate program. The program may be divided and recorded on a plurality of recording media. The program may be recorded in any form such as compression or encryption as long as it is restorable.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to display, on a display, a document in a first display mode by switching a document display mode from a second display mode to the first display mode in response to determining that the document displayed is a distributed document or a document having been distributed, that the document has never been browsed, and that a browsing time limit set for the document expires within a first predetermined period, wherein, in response to determining that the document has been browsed, the processor displays the document without switching the document display mode, the processor displays a folder in a first folder display mode by switching a folder display mode from a second folder display mode to the first folder display mode in response to determining that the folder includes a plurality of documents in which a number of the documents for which the document display mode is to be switched to the first display mode is equal to or greater than a predetermined number or in response to determining that the folder includes the plurality of documents in which a ratio of the number of the documents for which the document display mode is to be switched to the first display mode to a total number of the plurality of documents is equal to or greater than a predetermined ratio, the processor repeats switching the folder display mode between the first folder display mode and the second folder display mode, and the processor shortens an interval at which the processor repeats the switching of the folder display mode in response to determining that the number of the documents for which the document display mode is to be switched to the first display mode in the folder increases.

2. The information processing apparatus according to claim 1, wherein the processor displays the document in the first display mode by switching the document display mode from the second display mode to the first display mode at least in response to determining that a user who is required to browse the document has met a distributor or a creator within a second predetermined period or in response to determining that the user has exchanged information between the user and the distributor or the creator within the second predetermined period.

3. The information processing apparatus according to claim 1, wherein the processor displays the document in the first display mode by switching the document display mode from the second display mode to the first display mode at least in response to determining that a first user who is required to browse the document has met a second user who is required to browse the document within a third predetermined period, or in response to determining that the first user has exchanged information between the first user and the second user within the third predetermined period, the second user being different from the first user, and the first user is determined to be a user who has met the second user, or who has exchanged information with the second user, and the first user has a predetermined relationship with the second user.

4. The information processing apparatus according to claim 1, wherein the processor repeats switching the document display mode between the first display mode and the second display mode, and the processor shortens an interval at which the processor repeats switching in response to determining that the browsing time limit expires within a fourth predetermined period, the fourth predetermined period being shorter than the first predetermined period.

5. The information processing apparatus according to claim 1, wherein the processor repeats switching the document display mode between the first display mode and the second display mode, and the processor shortens an interval at which the processor repeats switching of the document display mode in response to determining that a user who is required to browse the document has a relationship with a distributor or a creator of the document within a fifth predetermined period.

6. The information processing apparatus according to claim 1, wherein, in response to determining that the number of the documents for which the document display mode is to be switched to the first display mode is equal to or greater than the predetermined number of the documents or in response to determining that the ratio of the number of documents for which the document display mode is to be switched to the first display mode to the total number of the plurality of documents is greater than or equal to the predetermined threshold, the processor reduces the number of the documents to be displayed in the first display mode.

7. The information processing apparatus according to claim 6, wherein the processor performs sorting of the document in one of orders including descending order by a number of people who are required to browse the document, descending order by a number of a person who has browsed the document, ascending order by a number of days to the browsing time limit, and ascending order by a length of a browsing period set to the document, and displays the document ranked at a first place to a predetermined place in the one of the orders in the first display mode.

8. The information processing apparatus according to claim 1, wherein the processor changes the document display mode of the document and displays the document in the document display mode changed in response to determining that writing is made to the document.

9. The information processing apparatus according to claim 1, wherein the processor repeats switching the document display mode between the first display mode and the second display mode, and the processor shortens an interval at which the processor repeats switching in response to determining that writing is made to the document.

10. The information processing apparatus according to claim 1, wherein the processor displays a reduced image of a first page of a document of which the browsing time limit has expired in the first display mode by switching the document display mode from the second display mode to the first display mode.

11. The information processing apparatus according to claim 10, wherein the processor repeats switching the document display mode between the first display mode and the second display mode.

12. The information processing apparatus according to claim 11, wherein the processor adjusts a display time period during which the reduced image is displayed in the first display mode in accordance with a level of browsing authority set to the document.

13. The information processing apparatus according to claim 12, wherein
the processor adjusts the display time period during which the reduced image is displayed in the first display mode such that the display time period during which the reduced image is displayed in the first display mode gets longer as the level of the browsing authority set to the document becomes higher.

14. The information processing apparatus according to claim 1, wherein
the determining that the document has never been browsed includes determining that the document has never been browsed by a user who is required to browse the document.

15. A non-transitory computer readable medium storing a program for causing a computer to execute a process for information processing, the process comprising:
switching a document display mode in which a document is displayed at least between a first display mode and a second display mode and that displays the document in the first display mode by switching the document display mode from the second display mode to the first display mode in response to determining that the document displayed is a distributed document or a document having been distributed, that the document has never been browsed, and that a browsing time limit set for the document expires within a first predetermined period, wherein,
in response to determining that the document has been browsed, the document is displayed without switching the document display mode,
a folder is displayed in a first folder display mode by switching a folder display mode from a second folder display mode to the first folder display mode in response to determining that the folder includes a plurality of documents in which a number of the documents for which the document display mode is to be switched to the first display mode is equal to or greater than a predetermined number or in response to determining that the folder includes the plurality of documents in which a ratio of the number of the documents for which the document display mode is to be switched to the first display mode to a total number of the plurality of documents is equal to or greater than a predetermined ratio,
switching of the folder display mode between the first folder display mode and the second folder display mode is repeated, and
an interval at which the switching of the folder display mode is repeated is shortened in response to determining that the number of the documents for which the document display mode is to be switched to the first display mode in the folder increases.

16. The non-transitory computer readable medium according to claim 15, wherein
the determining that the document has never been browsed includes determining that the document has never been browsed by a user who is required to browse the document.

* * * * *